United States Patent
Moore et al.

(10) Patent No.: US 12,380,215 B2
(45) Date of Patent: Aug. 5, 2025

(54) CYBER SECURITY BOOT STATUS MARKERS

(71) Applicant: CrowdStrike, Inc., Sunnyvale, CA (US)

(72) Inventors: Garrett Moore, Ottawa (CA); Blair C. Foster, Jr., Ottawa (CA)

(73) Assignee: CrowdStrike, Inc., Sunnyvale, CA (US)

( * ) Notice: Subject to any disclaimer, the term of this patent is extended or adjusted under 35 U.S.C. 154(b) by 194 days.

(21) Appl. No.: 18/358,564

(22) Filed: Jul. 25, 2023

(65) Prior Publication Data

US 2024/0403435 A1    Dec. 5, 2024

Related U.S. Application Data

(60) Provisional application No. 63/504,975, filed on May 30, 2023.

(51) Int. Cl.
*G06F 21/00* (2013.01)
*G06F 21/57* (2013.01)

(52) U.S. Cl.
CPC ...... *G06F 21/575* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 8,365,297 B1 | 1/2013 | Parshin et al. | |
| 8,417,962 B2 | 4/2013 | Novak et al. | |
| 8,793,477 B2 | 7/2014 | Horvath et al. | |
| 8,869,282 B1 | 10/2014 | Lazarowitz | |
| 9,021,244 B2 | 4/2015 | Bobzin | |
| 9,129,114 B2 | 9/2015 | Hamid | |
| 9,195,832 B1 * | 11/2015 | Rusakov | G06F 21/575 |

(Continued)

FOREIGN PATENT DOCUMENTS

| | | |
|---|---|---|
| CN | 107451463 | 12/2017 |
| RU | 2538287 | 8/2014 |

OTHER PUBLICATIONS

Branco, Rodrigo Rubira; Shamir, Udi. Architecture for automation of malware analysis. 2010 5th International Conference on Malicious and Unwanted Software. https://ieeexplore.ieee.org/stamp/stamp.jsp?tp=&arnumber=5665786 (Year: 2010).*

(Continued)

*Primary Examiner* — Jeremiah L Avery
(74) *Attorney, Agent, or Firm* — Law Office of Scott P. Zimmerman, PLLC

(57) ABSTRACT

Boot status markers record historical boot processes performed by a computer system. Each time the computer system boots, an operating system performs a boot process and interfaces with an antimalware driver. The antimalware driver determines the boot status markers that were set during previous boot processes. The antimalware driver may then classify other drivers based on the boot status markers set during the previous boot processes. The antimalware driver may then report driver classifications to the operating system. The operating system may then block, or allow, the drivers based on the driver classifications.

20 Claims, 23 Drawing Sheets

(56) References Cited

U.S. PATENT DOCUMENTS

| | | | |
|---|---|---|---|
| 9,432,397 | B2 | 8/2016 | Hamid et al. |
| 10,855,674 | B1* | 12/2020 | Geusz ..................... H04L 63/20 |
| 10,963,569 | B2 | 3/2021 | Harris et al. |
| 11,182,486 | B2 | 11/2021 | Cosgrove et al. |
| 2015/0347757 | A1* | 12/2015 | Yakovlev ............ G06F 11/1417 |
| | | | 713/2 |
| 2016/0306978 | A1* | 10/2016 | Thadikaran ......... G06F 12/1441 |
| 2018/0285570 | A1* | 10/2018 | Leblanc ........... G01N 27/44791 |
| 2019/0384917 | A1* | 12/2019 | Shah ........................ H04L 67/10 |
| 2020/0089888 | A1* | 3/2020 | Kelly .................... G06F 21/604 |
| 2020/0389491 | A1* | 12/2020 | Buck ...................... G06F 21/88 |
| 2020/0394300 | A1* | 12/2020 | Harris ................... G06F 21/575 |
| 2020/0394305 | A1* | 12/2020 | Cosgrove ............... G06F 21/56 |
| 2021/0044623 | A1* | 2/2021 | Bosch ................... G06F 21/575 |
| 2021/0312057 | A1* | 10/2021 | Kloth ................... G06F 21/575 |
| 2023/0273799 | A1* | 8/2023 | DeJong ................ G06F 9/4403 |
| | | | 713/2 |
| 2023/0325510 | A1* | 10/2023 | Tu ........................ G06F 21/575 |
| | | | 726/27 |

OTHER PUBLICATIONS

Malenko, Maja; Baunach Marcel. Device Driver and System Call Isolation in Embedded Devices. 2019 22nd Euromicro Conference on Digital System Design (DSD). https://ieeexplore.ieee.org/stamp/stamp.jsp?tp=&arnumber=8875063 (Year: 2019).*

Adelstein, Frank et al. Malicious code detection for open firmware. 18th Annual Computer Security Applications Conference, 2002. Proceedings. https://ieeexplore.ieee.org/stamp/stamp.jsp?tp=&arnumber=1176312 (Year: 2002).*

* cited by examiner

CYBER SECURITY BOOT STATUS MARKERS

CROSS-REFERENCE TO RELATED APPLICATION

This patent application claims domestic benefit of U.S. Provisional Patent Application No. 63/504,975 filed May 30, 2023 and incorporated herein by reference in its entirety.

BACKGROUND

The subject matter described herein generally relates to computers and to computer software and, more particularly, the subject matter relates to operating systems, to cyber security detection, and to secure booting.

Boot loops are a problem. Computer operating systems provide mechanisms for antimalware cyber security software. Microsoft's Early Launch AntiMalware (or ELAM), for example, allows antimalware service providers to start their security software before other third-party components are initiated. Antimalware drivers are first initialized and allowed to control initialization of subsequent drivers. An antimalware service provider may thus use the ELAM mechanism to block initialization of unknown or suspicious drivers. Blocking drivers, though, is risky, as multiple drivers may depend on each other. Moreover, if a driver is blocked that is critical for system startup, the computer system will be unable to boot; worse still, this blocking typically results in an endless "loop" of boot cycles. That is, the computer system attempts to start, but crashes, then reboots, again crashes, and repeats in an endless loop of boot cycles.

SUMMARY

Boot status markers record historical boot processes performed by a computer system. Each time the computer system boots, an operating system performs a boot process and interfaces with an antimalware driver. The antimalware driver determines the boot status markers that were set during a previous boot process. A boot status marker, for example, may indicate that the previous boot process failed. Because the previous boot process failed, the antimalware driver may determine that a corresponding driver is boot critical and must be executed during a current boot process. Should, however, the boot status marker indicate that the previous boot process successfully completed, then the antimalware driver may determine that the corresponding driver is non-boot critical and may be blocked during the current boot process. The antimalware driver may thus classify any driver based on its corresponding boot status marker set during the previous boot process. The antimalware driver may then report driver classifications to the operating system. The operating system may then defer to the driver classifications and block, or allow, the drivers during the current boot process.

BRIEF DESCRIPTION OF THE SEVERAL VIEWS OF THE DRAWINGS

The features, aspects, and advantages of boot status markers are understood when the following Detailed Description is read with reference to the accompanying drawings, wherein.

DETAILED DESCRIPTION

Figure 1:
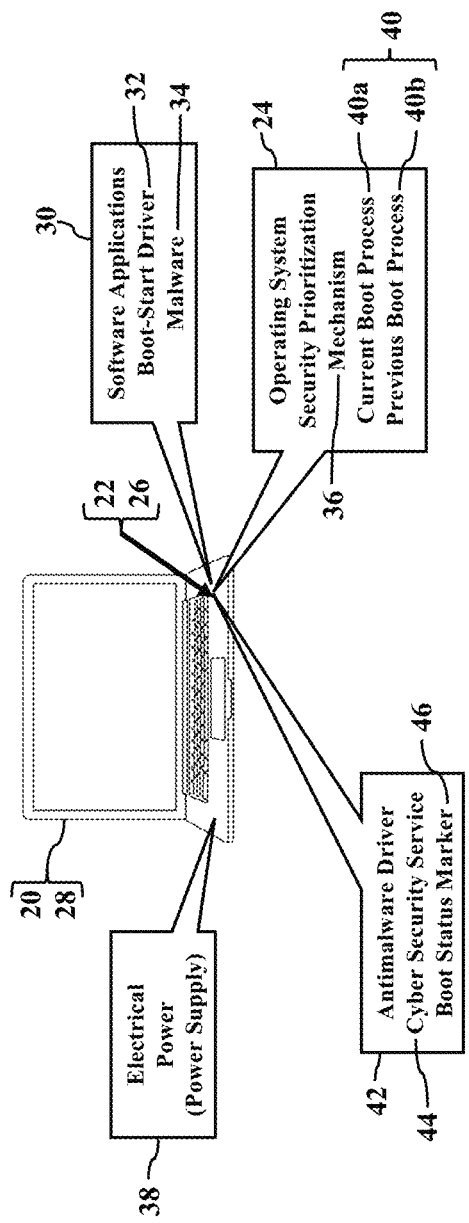
FIG. 1 illustrates examples of security prioritization.

Some examples relate to cyber security and to detection of cyber security attacks. When a computer system (such as a laptop or smartphone) is turned on, the computer system boots and a hardware processor begins executing an operating system. Unfortunately, though, even in this early stage of a boot process, the computer system may be subjected to a cyber security attack. Some software drivers, for example, may be corrupted or even contain malicious software (or malware). If the operating system were to load and execute these corrupted/malicious drivers, then the entire computer system is put at risk and perhaps becomes unusable. In order to prevent these cyber security attacks, the operating system may first load and execute an antimalware driver. As the boot process executes, the antimalware driver classifies other drivers to prevent cyber security attacks. The antimalware driver reports its driver classifications to the operating system. The operating system may then block, or allow, the drivers based on the driver classifications from the antimalware driver.

The antimalware driver, in particular, may use boot status markers. Each boot status marker was set during any previously-performed boot process. The boot status marker may indicate whether a previous boot process succeeded or failed. When, for example, the boot status marker indicates that any previous boot process completed and/or was successful, then the antimalware driver may determine that a corresponding driver (such as a boot-start driver) may be blocked from load and execution. That is, because the previous boot process was successful, the corresponding driver was not critical for that success. The antimalware driver may classify the driver as blockable (or as non-boot critical), thus allowing the operating system to block the driver without risk of failure during current or future boot processes. When, however, the boot status marker indicates that a previous boot process failed, then the corresponding driver may have been responsible for the failure. That is, because the previous boot process failed, the antimalware driver may allow the driver to load and execute to avoid another failure. The antimalware driver may thus classify the driver as not blockable (or as boot critical) to ensure that current or future boot processes succeed. The antimalware driver reports its driver classifications to the operating system. The operating system may then block, or allow, the drivers based on the driver classifications from the antimalware driver.

Boot status markers will now be described more fully hereinafter with reference to the accompanying drawings. Boot status markers, however, may be embodied and implemented in many different forms and should not be construed as limited to the examples set forth herein. These examples are provided so that this disclosure will be thorough and complete and fully convey boot status markers to those of ordinary skill in the art. Moreover, all the examples of boot status markers are intended to encompass both structural and functional equivalents thereof. Additionally, it is intended that such equivalents include both currently known equivalents as well as equivalents developed in the future (i.e., any elements developed that perform the same function, regardless of structure).

FIG. 1 illustrates examples of security prioritization. A client or endpoint computer system 20 has a hardware processor 22 that executes an operating system 24 stored in a memory device 26. The computer system 20 is illustrated as a laptop computer 28, but the computer system 20 may be any processor-controlled device (as later paragraphs will explain). The computer system 20 also stores software applications 30 in the memory device 26. While the computer system 20 may store hundreds or thousands of the software applications 30, some familiar packages of the software applications 30 may include a web browser, email, word processing, spreadsheet, slide presentation, and cloud storage. Some of the software applications 30 may also be boot-start drivers 32. While the boot-start drivers 32 may have any function or purpose, each boot-start driver 32 is typically a software-to-hardware interface that controls a corresponding device. The boot-start driver 32 must be installed to start the operating system 24. Sadly, though, some of the boot-start drivers 32 may be corrupted or even malicious software (or malware) 34. Malicious rootkits, for example, often mask themselves as the boot-start drivers 32, so the rootkits gain unauthorized access to computer devices.

The operating system 24 may thus include a security prioritization mechanism 36. The security prioritization mechanism 36 provides an initial cyber security evaluation of the boot-start drivers 32. For example, when the laptop computer 28 receives an electrical power 38 (e.g., voltage and current via a power supply) and is switched on, the hardware processor 22 executes a boot process 40 associated with the operating system 24. The boot process 40 executes the security prioritization mechanism 36 prior to loading and executing any of the boot-start drivers 32. The security prioritization mechanism 36 allows an antimalware driver 42 to first evaluate each boot-start driver 32. The operating system 24, for example, may refrain from loading and/or executing any boot-start driver 32 until first characterized by the antimalware driver 42. The operating system 24 may thus defer to the driver characterizations provided by the antimalware driver 42. If, for example, the antimalware driver 42 determines that the boot-start driver 32 does not contain or resemble the malware 34, then the antimalware driver 42 may approve and release the boot-start driver 32. The antimalware driver 42 may thus authorize the operating system 24 to load, initialize, and/or execute the boot-start driver 32. If, however, the antimalware driver 42 determines that the boot-start driver 32 resembles or contains the malware 34, then the antimalware driver 42 may block the boot-start driver 32. The antimalware driver 42 may thus deny the operating system 24 from loading, initializing, and/or executing the boot-start driver 32. The antimalware driver 42 thus provides a cyber security service 44 that protects the computer system 20 from malware 34 posing as the boot-start driver 32.

Conventional antimalware schemes, though, can cause boot failures. Conventional antimalware drivers often block or deny boot-start drivers that are critical to the operating system 24. When these critical boot-start drivers are blocked, the operating system 24 may not successfully load and/or the operating system 24 may not be successfully executed by the hardware processor 22. Conventional antimalware schemes may thus result in an endless or infinite "loop" of boot cycles where a computer repeatedly crashes and reboots.

Here, though, the antimalware driver 42 elegantly records previous boot attempts. As the antimalware driver 42 operates during the current boot process (illustrated as reference numeral 40a), the antimalware driver 42 checks for a boot status marker 46 stored in the memory device 26. The boot status marker 46 was set during a previous boot process 40b that was attempted or executed before, or preceding, the current boot process 40a. The boot status marker 46 indicates whether the previous boot process 40b successfully completed or failed. As the antimalware driver 42 operates during the current boot process 40a, the antimalware driver 42 evaluates any boot-start driver 32 based on the boot status marker 46 set during the previous boot process 40b. The antimalware driver 42 retrieves and reads the boot status marker 46 from the memory device 26 (perhaps a persistent, non-volatile portion). The antimalware driver 42 may then classify or characterize the boot-start driver 32 based on the boot status marker 46 previously established or set during the previous boot process 40b.

Figure 2:
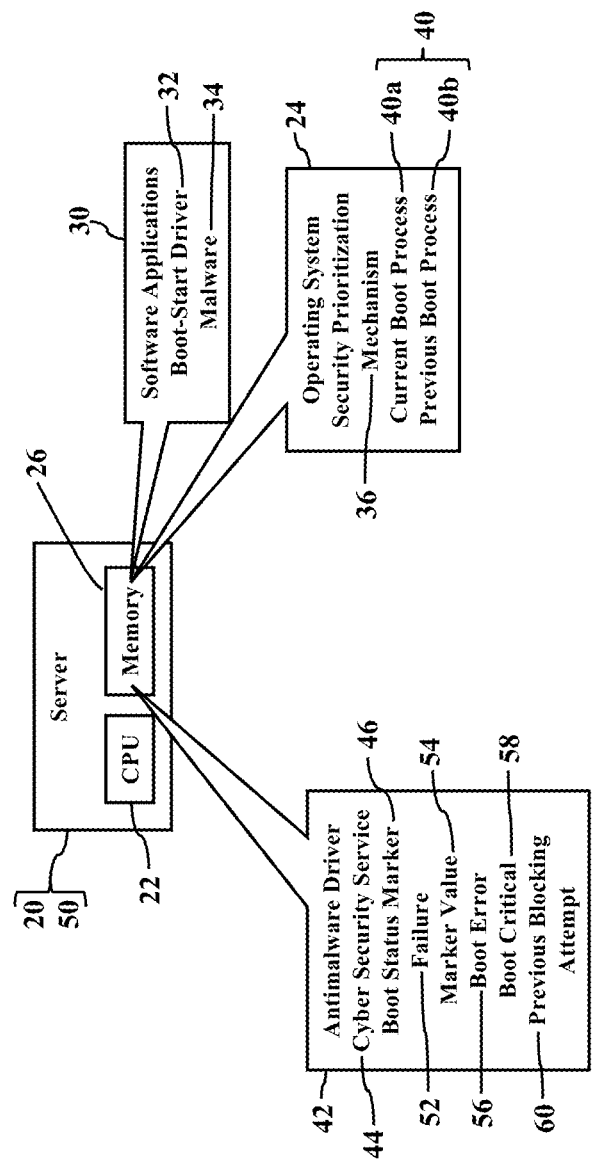
FIGS. 2-4 illustrate examples of driver classifications based on boot status markers.

FIG. 2 illustrates examples of critical driver classification. When the antimalware driver 42 reads the boot status marker 46, the antimalware driver 42 may determine that the boot-start driver 32 is critical for the current boot process 40a. FIG. 2 illustrates the computer system 20 as a server 50 that stores and executes the operating system 24. As the operating system 24 performs the current boot process 40a, the antimalware driver 42 evaluates the boot-start driver 32 based on the boot status marker 46 set during any previous boot process 40b. In this example, let's assume that the boot status marker 46 indicates a failure 52 of the previous boot process 40b. While the boot status marker 46 may have any text, number, or unit, let's assume a simple marker value 54 of zero (0). That is, when the previous boot process 40b failed to complete, the previous boot process 40b and/or the operating system 24 may have generated a boot error 56. Because the previous boot process 40b failed, the antimalware driver 42 cooperated/interfaced with the operating system 24 to write the value 54 (e.g., 0) of the boot status marker 46 to the memory device 26. The zero (0) value 54 of the boot status marker 46 represents or indicates the failure 52 of the previous boot process 40b.

The antimalware driver 42 may then classify the boot-start driver 32. As the server 50 and/or the operating system 24 performs the current boot process 40a, the antimalware driver 42 cooperates/interfaces with the operating system 24 to read the value 54 (e.g., 0) of the boot status marker 46 that is associated with the boot-start driver 32. The antimalware driver 42, for example, may query the memory device 26 for a name, number, register, or other unique driver identifier associated with the boot-start driver 32. When the antimalware driver 42 receives or retrieves the boot status marker 46, the antimalware driver 42 executes logical rules or other programming code that classify the boot-start driver 32. Again, even though the boot status marker 46 may have any alphanumeric combination, in this example the boot status marker 46 has the value 54 of zero (0). Because the boot status marker 46 has the value 54 of zero (0), the antimalware driver 42 determines the failure 52 of the previous boot process 40b. Moreover, because the previous boot process 40b failed, the antimalware driver 42 determines that the boot-start driver 32 is boot critical 58. In other words, because the previous boot process 40b failed to complete, a previous blocking attempt 60 (performed during the previous boot process 40b) perhaps caused the boot error 56 and the failure 52. The antimalware driver 42 thus cleared or zeroed the boot status marker 46 during the previous boot process 40b. The zero value 54 thus indicates or records that the antimalware driver 42 attempted to block the boot-start driver 32, but the blocked boot-start driver 32 prevented the server 50 from booting. So, as the server 50 and/or the operating system 24 perform(s) the current boot process 40a, the antimalware driver 42 may thus classify the boot-start driver 32 as the boot critical 58.

Critical drivers may still execute. When the boot-start driver 32 is classified as the boot critical 58, the antimalware driver 42 may or must permit execution. That is, as current boot process 40a executes, the antimalware driver 42 determines that the boot-start driver 32, classified as the boot critical 58, cannot be blocked. The boot-start driver 32, classified as the boot critical 58, must load and execute to ensure the current boot process 40a successfully completes; otherwise, if the critical boot-start driver 32 is blocked, the infinite boot loop failure may occur. So, even though the boot-start driver 32 may have a malicious signature, bad indicator, or other characteristic of the malware 34, the antimalware driver 42 may classify the boot-start driver 32 as the boot critical 58, even though the malware 34 may be detected. This driver classification (e.g., bad but boot critical 58) allows the boot-start driver 32 to load and execute to ensure a successful completion of the current boot process 40a. The rationale behind this policy is that critical boot-drivers and any other system drivers may be essential parts of the operating system 24, so any failure in their initialization will render the operating system 24 unbootable. The computer system 20 may not boot unless all its critical drivers are successfully loaded and initialized. This cyber security policy may therefore compromise some security in favor of availability and serviceability.

Figure 3:
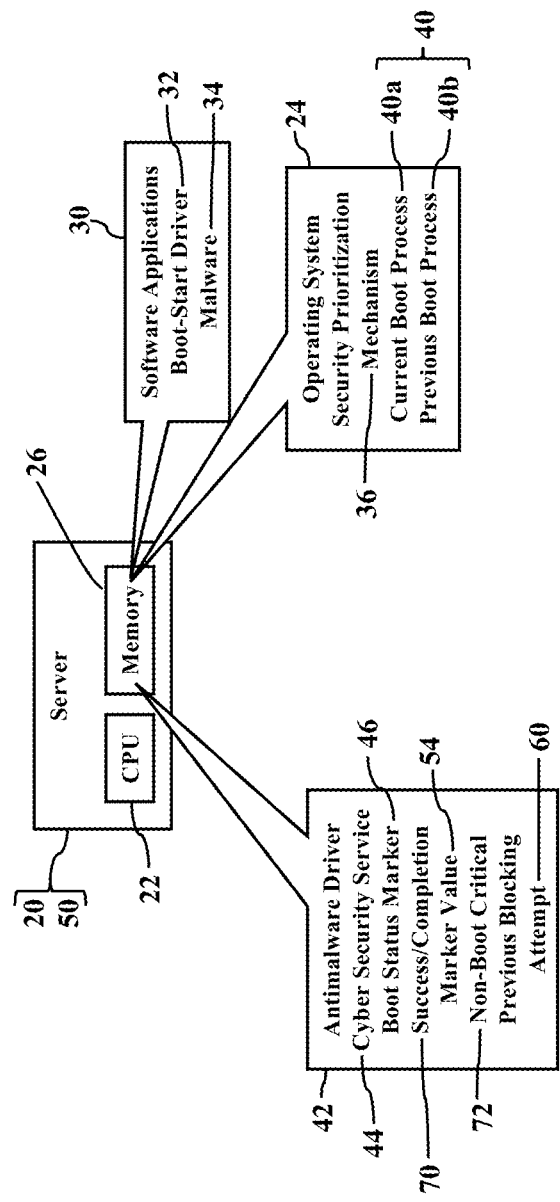

FIG. 3 illustrates examples of non-critical driver classification. When the antimalware driver 42 reads the boot status marker 46, the antimalware driver 42 may determine that the boot-start driver 32 is not critical for the current boot process 40a. As the computer system 20 (again illustrated as the server 50) and/or the operating system 24 performs the current boot process 40a, the antimalware driver 42 evaluates the boot-start driver 32 based on the boot status marker 46 set during the previous boot process 40b. In this example, let's assume that the boot status marker 46 indicates a success or completion 70 of the previous boot process 40b. Again, while the boot status marker 46 may have any text, value, or unit, in this example let's assume the boot status marker 46 has a simple value 54 of one (1). That is, when the previous boot process 40b successfully completed, the antimalware driver 42 cooperated/interfaced with the operating system 24 to write the binary value "1" of the boot status marker 46 to the memory device 26. The completion 70 of the previous boot process 40b may be recorded at any event, phase, or task (such as completion of a power-on self-test, loading of the operating system 24, system configuration, system utilities, and/or user authentication). The binary one (1) value 54 of the boot status marker 46 indicates the completion 70 of the previous boot process 40b.

The antimalware driver 42 may then classify the boot-start driver 32. As the laptop computer 28 and/or the operating system 24 performs the current boot process 40a, the antimalware driver 42 cooperates/interfaces with the operating system 24 to read the value 54 (e.g., 1) of the boot status marker 46 that is associated with the boot-start driver 32. The antimalware driver 42, for example, may query the memory device 26 for a name, number, register, or other unique driver identifier associated with the boot-start driver 32. When the antimalware driver 42 receives or retrieves the boot status marker 46, the antimalware driver 42 executes logical rules or other programming code that classify the boot-start driver 32. Again, even though the boot status marker 46 may have any alphanumeric combination, in this example the boot status marker 46 has the value 54 of binary one (1). Because the boot status marker 46 has the value 54 of one (1), the antimalware driver 42 determines the completion 70 of the previous boot process 40b. Moreover, because the previous boot process 40b successfully completed, the antimalware driver 42 determines that the boot-start driver 32 is non-boot critical 72. In other words, because the previous boot process 40b successfully completed, the previous blocking attempt 60 (performed during the previous boot process 40b) still allowed the operating system 24 to load and to execute. For example, the power-on self-test completed, the operating system 24 loaded, the system configuration loaded, the system utilities loaded, and/or the user authentication was successful. The antimalware driver 42 thus interfaced with the operating system 24 to write the value 54 of the boot status marker 46 to indicate or record that the antimalware driver 42 successfully blocked the boot-start driver 32 during the previous boot process 40b. Because the boot-start driver 32 was previously blocked, and yet the previous boot process 40b still successfully completed, the antimalware driver 42 may thus classify the boot-start driver 32 as the non-boot critical 72.

Non-critical drivers may be denied. When the boot-start driver 32 is classified as the non-boot critical 72, the antimalware driver 42 may deny read, load, and/or execution. That is, as the current boot process 40a executes, the antimalware driver 42 determines that the boot-start driver 32, classified as the non-boot critical 72, may be blocked without risk of the endless boot loop failure. So, when the boot-start driver 32 has a malicious signature, bad indicator, or other characteristic of the malware 34, the antimalware driver 42 may deny the boot-start driver 32 from loading and executing during the current boot process 40a. The rationale behind this policy is that non-critical boot-drivers and/or system drivers are not essential parts of the operating system 24, so any failure in their initialization will not jeopardize the operating system 24 from booting.

Figure 4:
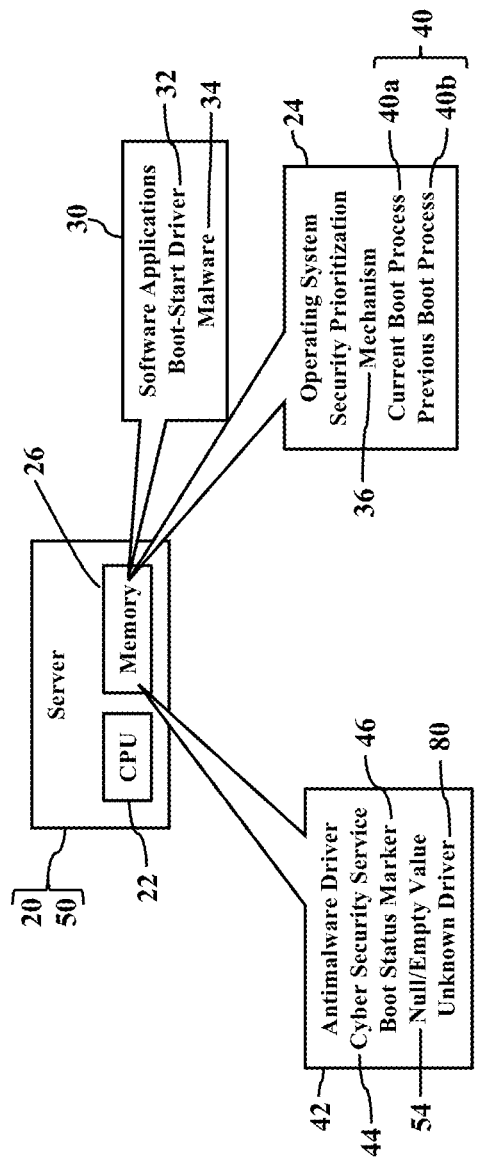

FIG. 4 illustrates examples of unknown driver classification. When the antimalware driver 42 attempts to block the boot-start driver 32 during the current boot process 40a, the antimalware driver 42 checks the memory device 26 for the value 54 associated with the boot status marker 46. As FIG. 4 illustrates, when the antimalware driver 42 reads/retrieves the boot status marker 46, the boot status marker 46 may indicate or represent that the boot-start driver 32 is an unknown driver 80. Again, while the boot status marker 46 may have any alphanumeric content to indicate the unknown driver 80, in this example let's assume the boot status marker 46 has an empty, null, or undefined value 54 (such as no bits). When the boot status marker 46 lacks the value 54, the antimalware driver 42 may execute logical rules or other programming code that classify the boot-start driver 32 as the unknown driver 80. That is, the antimalware driver 42 did not record a result of the previous blocking attempt 60 during the previous boot process 40*b*. Because the boot status marker 46 is indeterminate, the antimalware driver 42 may classify the boot-start driver 32 as the unknown driver 80. The antimalware driver 42 may permit the boot-start driver 32 to load and to execute during the current boot process 40*a*, thus allowing the antimalware driver 42 to record the result (e.g., the failure 52 or the completion 70 of the current boot process 40*a*, as explained with reference to FIGS. 2-3).

Figure 5:
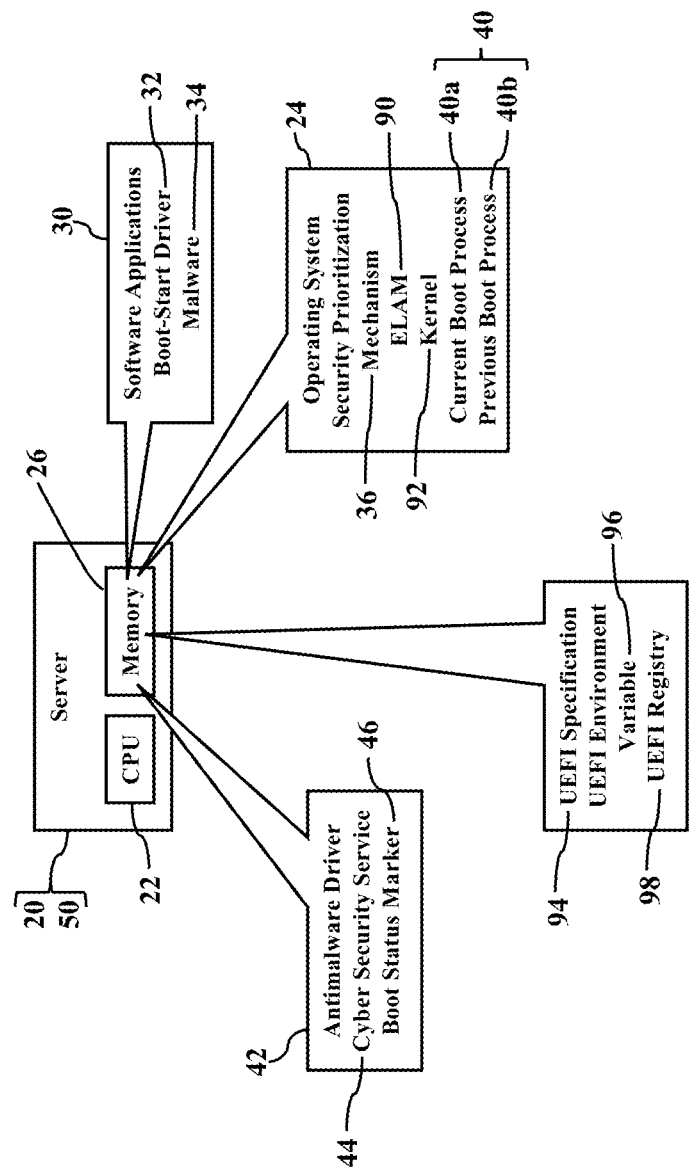
FIG. 5 illustrates examples applied to Microsoft's Early Launch AntiMalware (or ELAM) feature.

FIG. 5 illustrates examples applied to Microsoft's Early Launch AntiMalware (or ELAM) phase or feature 90. The ELAM phase or feature 90 allows the antimalware driver 42 to start before other third-party components (such as the boot-start driver 32). The operating system 24 first initializes the antimalware driver 42, and the antimalware driver 42 may then be allowed to control the initialization of the subsequent boot-start driver(s) 32. The operating system 24 thus provides opportunities for the antimalware driver 42 to evaluate the boot-start driver(s) 32 for the presence of the malware 34. The ELAM phase or feature 90 may be provided by any of the MICROSOFT® operating systems. Any version of the WINDOWS® and WINDOWS SERVER® operating systems, for example, may provide a secure boot feature which protects the boot configuration and components. A kernel 92 of the WINDOWS® operating system may first launch the ELAM phase or feature 90 and the antimalware driver 42, thus allowing the antimalware driver 42 to detect the malware 34 during the boot process 40 and to prevent the malware 34 from initializing. Some of the boot-start drivers 32, for example, may be corrupted or even contain the malware 34 (such as malicious rootkits, as earlier explained). The antimalware driver 42 classifies each boot-start driver 32 (for example, the boot critical 58, the non-boot critical 72, and the unknown driver 80 as above explained) and reports each classification to the kernel 92. The WINDOWS® operating system 24 may then defer and load the boot-start driver 32, or not load the boot-start driver 32, based on the corresponding the classification from the antimalware driver 42. The below table illustrates examples of Microsoft's driver classifications:

| Policy name | Policy value | Description |
|---|---|---|
| PNP_INITIAL-IZE_DRIVERS_DEFAULT | 0 × 00 | Load known good drivers only. |
| PNP_INITIAL-IZE_UNKNOWN_DRIVERS | 0 × 01 | Load known good and unknown drivers only. |
| PNP_INITIALIZE_BAD_CRIT-ICAL_DRIVERS | 0 × 03 | Load known good, unknown, and known bad critical drivers. (This is the default setting.) |
| PNP_INITIAL-IZE_BAD_DRIVERS | 0 × 07 | Load all drivers. |

The antimalware driver 42 sets the boot status marker 46. The antimalware driver 42 cooperates or interfaces with the operating system 24 to set or write the value 54 of the boot status marker 46. While any mechanism may be used, the antimalware driver 42 may elegantly utilize the Unified Extensible Firmware Interface (or UEFI) specification 94 to set the boot status marker 46. The UEFI specification 94 and firmware provides environment variables 96 which pass information from UEFI firmware to the operating system 24. The UEFI environment variables 96 may be written to a dedicated and persistent UEFI registry 98 in a non-volatile memory device 26, which means a system reboot does not clear them. As the antimalware driver 42 executes during the previous boot process 40*b*, the antimalware driver 42 may set the boot status marker 46 (perhaps during the ELAM feature 90) using the UEFI environment variables 96. The antimalware driver 42 thus elegantly records the results of the previous boot process 40*b*. As the antimalware driver 42 evaluates any boot-start driver 32 during the current boot process 40*a*, the antimalware driver 42 checks for the its corresponding boot status marker 46 persistently recorded as the UEFI environment variable 96 during the previous boot process 40*b*. The antimalware driver 42 may then recommend blocking or allowing any boot-start driver 32 based on its corresponding boot status marker 46 recorded as the UEFI environment variable 96 during the previous boot process 40*b*.

Boot loops are avoided. The antimalware driver 42 may attempt to block the boot-start driver 32, and if that blocking prevents the computer system 20 from booting, the antimalware driver 42 may automatically remediate the failed boot process 40. The antimalware driver 42, by recording the boot status marker 46, determines during the subsequent boot process 40*a* that the boot-start driver 32 cannot be blocked without rendering the computer system 20 inoperable. The antimalware driver 42 may thus automatically remediate by not blocking boot-start driver 32 during the current boot process 40*a*. The boot status marker 46 is thus a safety mechanism that prevents the antimalware driver 42 from rendering customer machines unbootable due to blocking the boot-start driver 32.

Critical drivers are recognized and loaded. In the event that any blocked driver (such as the boot-start driver 32) was the boot critical 58 and prevented the computer system 20 from starting, the antimalware driver 42 is able, in some examples, to automatically detect and remediate this boot failure 52 on any following/subsequent boot cycle/process 40. Otherwise, blocking a boot critical driver would mean a boot loop which would require manual intervention.

At the time of ELAM processing, file systems are typically not mounted writable. As it is possible that the antimalware driver 42 may block a boot critical driver (such as, specifically, a file system critical driver), the antimalware driver 42 may not rely on writing to the file system to record the boot status marker 46. In some examples, to solve this problem, the antimalware driver 42 may use the UEFI environment variable 96 that is accessible through the FirmwareEnvironmentVariable APIs. When the antimalware driver 42 initializes, the antimalware driver 42 may thus check for the value 54 or existence of the boot status marker 46 in the UEFI store or registry 98. If the boot status marker 46 is present in the UEFI store or registry 98, then the boot status marker 46 may indicate that the computer system 20 did not boot safely, and the antimalware driver 42 may decline to block the corresponding boot-start driver 32 unless previously blocked successfully. Any drivers which cannot be blocked in this state may be classified as the boot critical 58.

Figure 6:
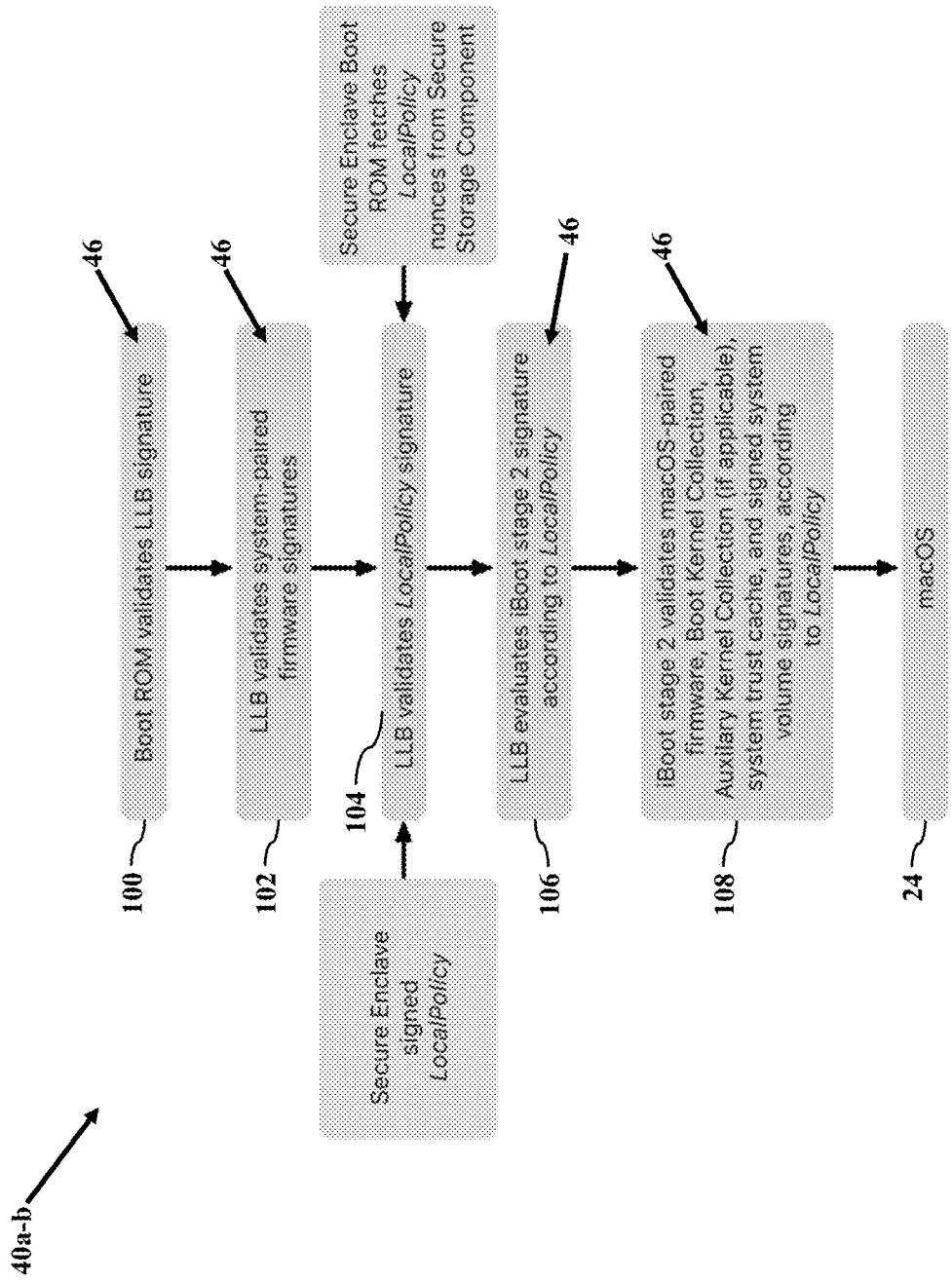
FIG. 6 illustrates examples applied to Apple's operating systems.

FIG. 6 illustrates examples applied to Apple's operating systems. FIG. 6, in particular, illustrates the boot process 40 that is executed by the MAC® computer, the IPHONE®, the IPAD®, and other APPLE® products. The boot status marker 46 may be implemented by any of the Apple® operating systems. Any version of the MACOS®, IOS®, and OS® operating systems, for example, may implement the boot status marker 46 during a secure boot process to persistently record past, previous, historical, and/or current boot processes 40a-b. A first step or phase 100 of the boot process 40, for example, executes code from the Boot ROM. This first step verifies not only the operating system code itself, but also the security policies and even kernel-level extensions/permissions to the kernel. Any of Apple's operating systems may thus implement and/or set the boot status marker 46 during the first step or phase 100 of the boot process 40. A second step or phase 102 of the boot process 40 launches a Low Level Bootstrap (or LLB), verifies signatures, and loads system-paired firmware. The boot status marker 46 may be implemented and/or set during the second step or phase 102 of the boot process 40. A third step or phase 104 of the boot process 40 loads and validates the LocalPolicy, which is a file signed by the Secure Enclave Processor. The LocalPolicy file describes the configuration that the user has chosen for the system boot and runtime security policies. The boot status marker 46 may be implemented and/or set during the third step or phase 104 of the boot process 40. A fourth step or phase 106 of the boot process 40 evaluates the signature for iBoot. The boot status marker 46 may be implemented and/or set during the fourth step or phase 106 of the boot process 40. During a fifth step or phase 108 of the boot process 40, the Low Level Bootstrap (or LLB) hands off to iBoot and loads macOS-paired firmware. iBoot also looks at information about the LocalPolicy handed to it from LLB. If the LocalPolicy indicates that there should be an Auxiliary Kernel Collection (AuxKC), iBoot looks for it on the file system, verifies that it was signed by the Secure Enclave with the same key as the LocalPolicy, and verifies that its hash matches a hash stored in the LocalPolicy. The boot status marker 46 may be implemented and/or set during the fifth step or phase 108 of the boot process 40.

Apple's operating systems may further protect against the malware 34. Apple's operating systems may implement other threat intelligence process(es) to quickly identify and block the malware 34. For example, malware defenses may be structured in layers. A first layer, for example, may prevent launch or execution of the malware 34. A second layer may block the malware 34 from running (such as Apple's Notarization® and XProtect®) A third layer remediates malware 34 that has executed (such as XProtect®). The boot status marker 46 may be implemented and/or set during of Apple's layers (such as the Notarization® and XProtect® processes).

Figure 7:
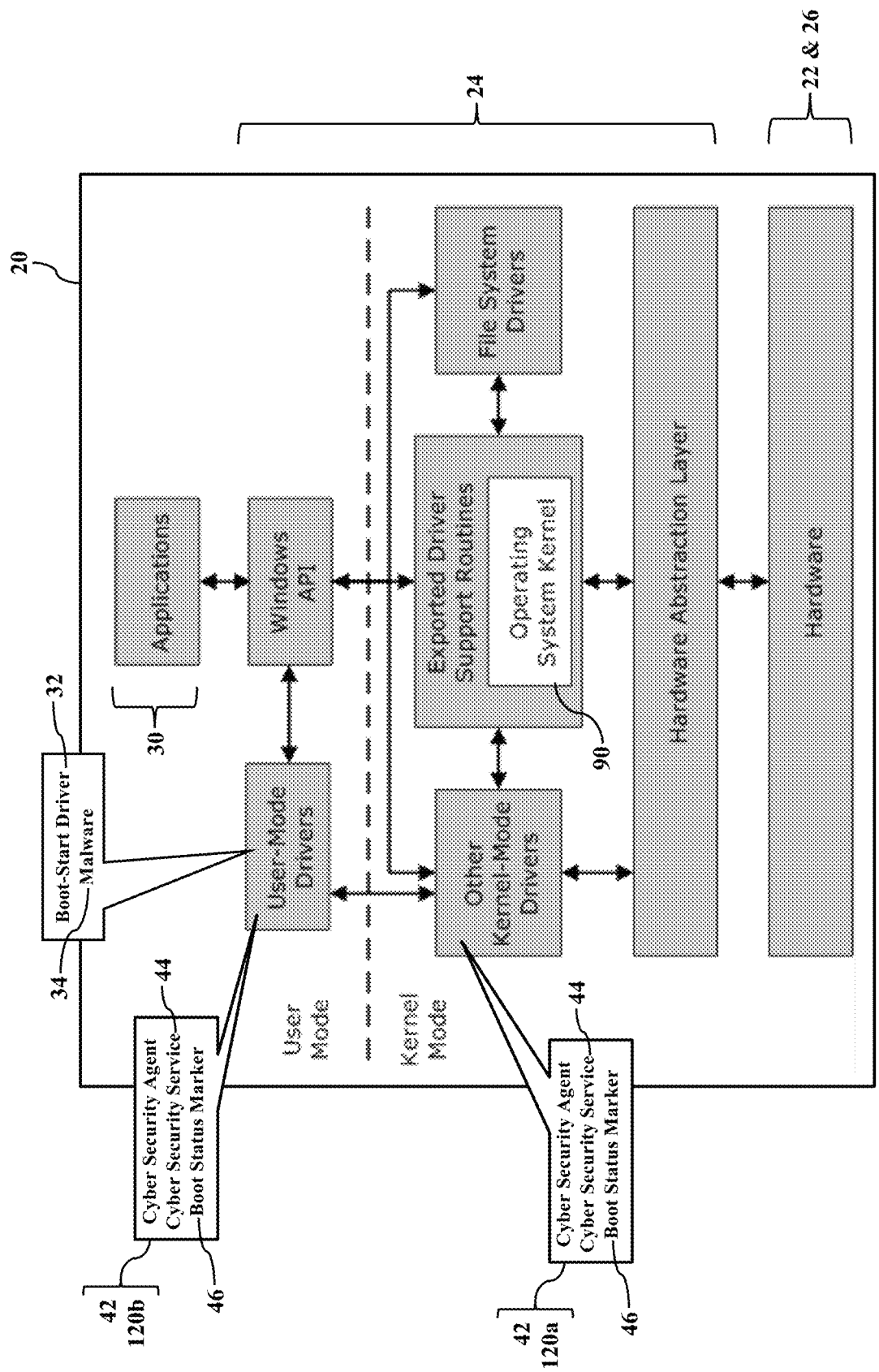
FIG. 7 illustrates examples of an antimalware driver.

FIG. 7 illustrates more examples of the antimalware driver 42. FIG. 7 illustrates the antimalware driver 42 as a cyber security agent 120. The cyber security agent 120 is installed on the computer system 20, is stored by the memory device 26, and is executed by the hardware processor 22. The antimalware driver 42, for example, may have kernel-level components 120a having kernel-level permissions to the kernel 92 of the operating system 24. The antimalware driver 42 may additionally have user-mode components 120b having user-level permissions to a user mode of the operating system 24. The antimalware driver 42 may include computer program, code, or instructions that classify the boot-start driver 32 by using the boot status marker 46. The antimalware driver 42 may further include code or instructions that scan and monitor the computer system 20 for events, communications, processes, activities, behaviors, data values, usernames/logins, locations, contexts, and/or patterns that indicate evidence of a cyber security attack (such as the malware 34). Because the antimalware driver 42 has kernel-level permissions, the antimalware driver 42 may monitor any kernel-level activity and/or any user-mode activity conducted by the computer system 20. The antimalware driver 42 may register for and receive kernel-level notifications and call backs from the kernel 92.

Figure 8:
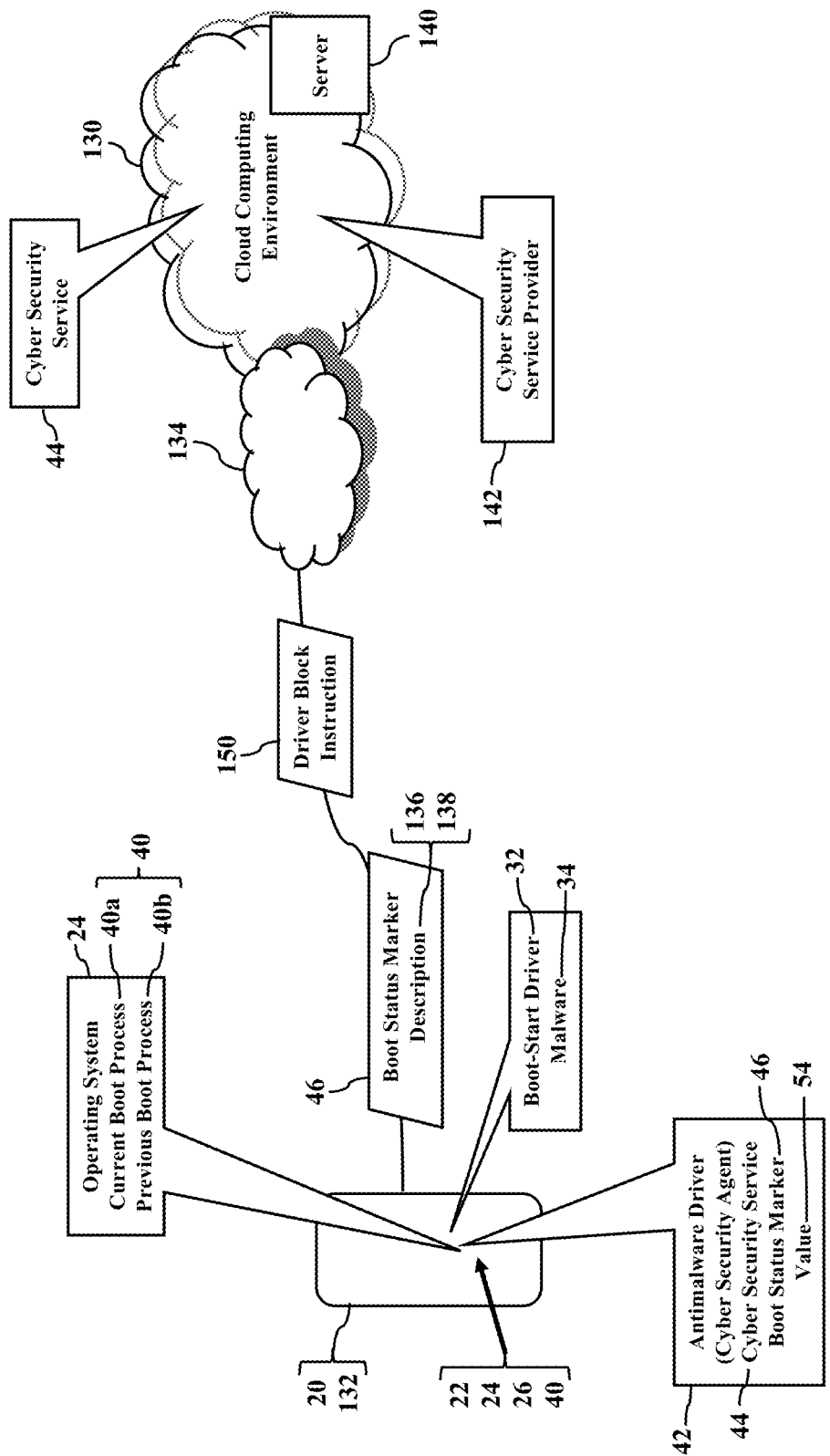
FIGS. 8-10 illustrate examples of cloud reporting and analysis.
Figure 9:
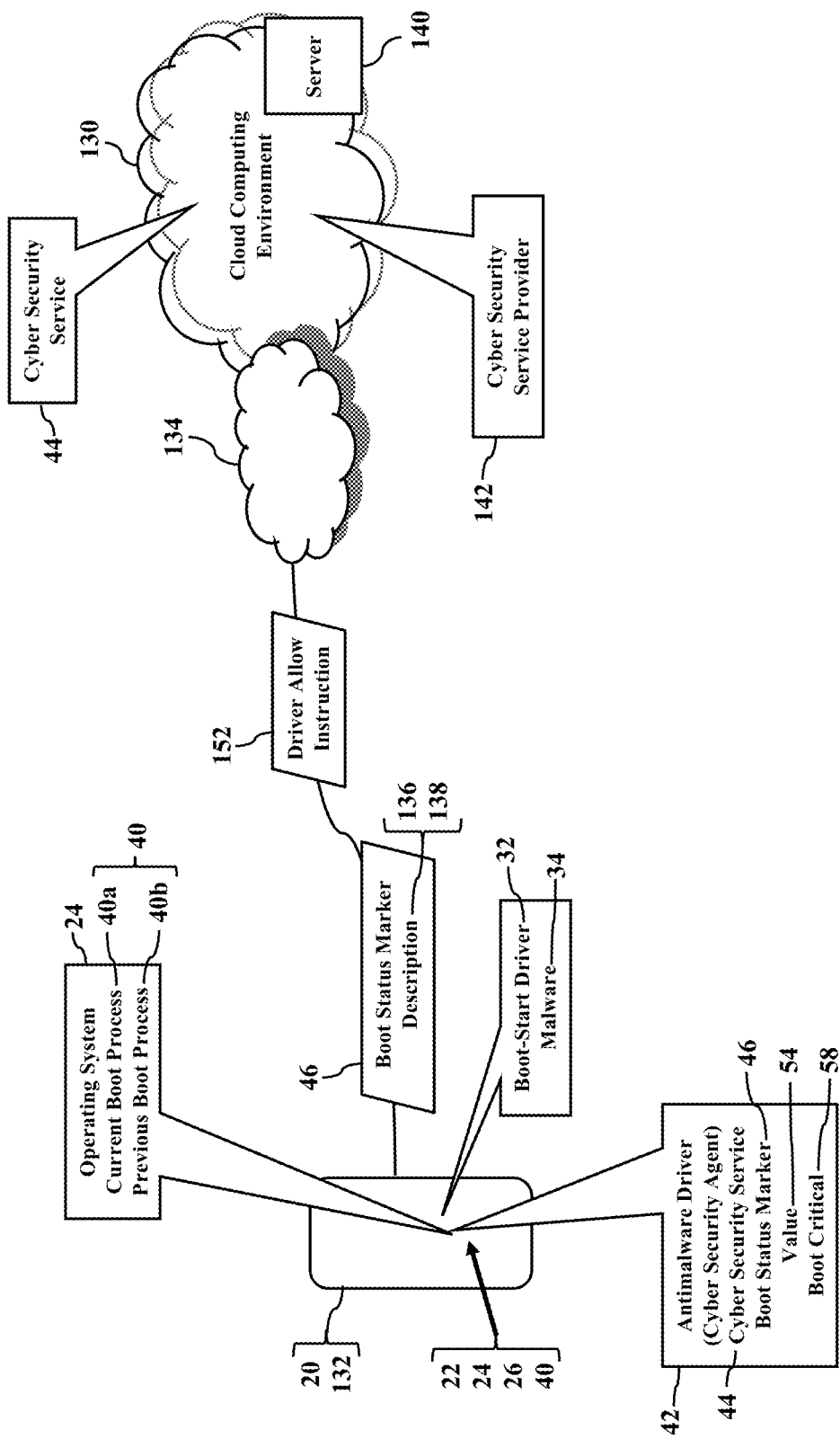

FIGS. 8-9 illustrate examples of cloud reporting and analysis. The computer system 20 may operate in a cloud-computing environment 130. Again, while the computer system 30 may have any embodiment, FIGS. 8-9 illustrate the computer system 20 as a mobile smartphone 132. In this example, the computer system 20 (e.g., the smartphone 132) has a network interface to an access network 134, thus allowing communications via the cloud-computing environment 130 (e.g., public Internet, private network, and/or hybrid network) with other servers, devices, computers, or other networked members operating within, or affiliated with, the cloud-computing environment 130. The smartphone 132 stores and executes the antimalware driver 42 that characterizes the boot-start driver 32. The cloud-computing environment 130 delivers hosted cloud-native services, like storage, cyber security, servers, and application services, via any communications network (such as the Internet). Various implementations of the cloud-computing environment 130 are possible and could be used in the examples herein described.

The antimalware driver 42 may cooperate with the cloud-computing environment 130. For example, when the smartphone 132 boots and performs the boot process 40, the antimalware driver 42 may set and store the boot status marker 46 (as this disclosure previously explained). However, because the smartphone 132 also communicates with the cloud-computing environment 130, the antimalware driver 42 may report or upload the boot status marker 46 to the cloud-computing environment 130. The antimalware driver 42 may further send a more complete boot status marker description 136 that describes or identifies the boot-start driver 32 (such as a driver identifier 138) and its corresponding boot status marker 46. The antimalware driver 42, for example, may instruct the smartphone 132 to send the boot status marker 46 and/or the boot status marker description 136 to a designated network address associated with the cloud-computing environment 130. While the boot status marker 46 and/or the boot status marker description 136 may be sent to any destination, FIG. 8 illustrates cloud collection. The cloud-computing environment 130, in other words, may task or assign a cloud server 140 as a collection destination for boot status markers 46 sent by clients participating in the cloud-based cyber security service 44. When the cloud server 140 receives the boot status markers 46 and/or the boot status marker description(s) 136, the cloud server 140 may then record and analyze the boot status markers 46 and/or the boot status marker descriptions 136 sent by the client devices (such as the smartphone 132). A cyber security service provider 142 may thus use the boot status markers 46 and/or the boot status marker descriptions 136 to block the load and initialization of unknown or suspicious boot-start drivers 32.

The cloud-based cyber security service 44 may provide boot blocking instructions. When the cyber security service 44 analyzes the boot status marker 46 and/or the boot status marker description 136, the cyber security service 44 may classify the corresponding boot-start driver 32 and return send instructions to the smartphone 132. If the particular boot-start driver 32, for example, resembles the malware 34, then the cyber security service provider 142 may generate and send a driver block instruction 150 to the network IP address associated with the smartphone 132. The driver block instruction 150, for example, may instruct the antimalware driver 42 to set the marker value 54 of the boot status marker 46 to indicate the boot-start driver 32 should be blocked (e.g., the non-boot critical 72 above explained) during the current/next/subsequent boot process 40. If, however, the boot-start driver 32 does not contain or resemble the malware 34, then FIG. 9 illustrates a driver allow instruction 152 generated and sent by the cyber security service provider 142. The driver allow instruction 152 may instruct the antimalware driver 42 to set the value 54 of the boot status marker 46 to indicate the boot-start driver 32 is safe and/or may be loaded and executed during the current/next/subsequent boot process 40. Moreover, if the cyber security service 44 cannot classify the boot-start driver 32, then the driver allow instruction 152 may instruct the antimalware driver 42 to set the value 54 of the boot status marker 46 to indicate the boot-start driver 32 is unknown and may be loaded and executed during the current/next/subsequent boot process 40. Similarly, even if the boot-start driver 32 is bad or resembles the malware 34, the cyber security service 44 may classify the malicious/suspicious as the boot critical 58. The driver allow instruction 152 may thus instruct the antimalware driver 42 to set the value 54 of the boot status marker 46 to indicate that, even though the boot-start driver 32 is harmful/malicious/suspicious, the boot-start driver 32 is classified as the boot critical 58 and may or must be loaded and executed during the current/next/subsequent boot process 40. The antimalware driver 42 may thus cooperate with the cloud-computing environment 130 to classify any boot-start driver 32 using the boot status marker 46.

Boot loops are again avoided. The antimalware driver 42, and/or the cloud-computing environment 130, may attempt to block the boot-start driver 32. If that blocking prevents the computer system 20 (e.g., the mobile smartphone 132) from booting, the antimalware driver 42 and/or the cloud-computing environment 130 may automatically remediate the failed boot process 40. The antimalware driver 42 and/or the cloud-computing environment 130 determines, by recording the boot status marker 46, that the boot-start driver 32 cannot be blocked without rendering the computer system 20 inoperable. The boot status marker 46 is thus a safety mechanism that prevents the cyber security service 44 from rendering customer machines unbootable due to blocking the boot-start driver 32.

Critical drivers are recognized and loaded. In the event that any blocked driver (such as the boot-start driver 32) was the boot critical 58 and prevented the computer system 20 (e.g., the mobile smartphone 132) from starting, the antimalware driver 42 and/or the cloud-computing environment 130 is/are able, in some examples, to automatically detect and remediate this boot failure 52 by automatically unblocking critical drivers. Otherwise, blocking a boot critical driver would mean a boot loop which would require manual intervention.

The cyber security service 44 thus provides a nimble and effective endpoint detection and response solution. The antimalware driver 42 (e.g., the cyber security sensory agent 120) may be a boot-based endpoint detection and response tool that blocks any cybersecurity attack posing as the boot-start driver 32. The antimalware driver 42 may be downloaded and installed to any server, switch, router, smartphone, endpoint device, or any other computer system 20. The antimalware driver 42 may continuously monitor any computer system 20 to detect and to respond to any cybersecurity attack. The antimalware driver 42, in particular, may monitor for, detect, and/or block suspicious boot-start drivers 32, even before online communication is established. The antimalware driver 42 provides the cyber security service 44 and detects evidence of the cybersecurity attack, even while offline. The antimalware driver 42 may thus be a local endpoint detection and response (EDR) solution.

The antimalware driver 42 may also integrate with an XDR solution. Extended detection and response (XDR) collects threat data from siloed security tools across an organization's technology stack. The antimalware driver 42, when online, may upload security telemetry data from the host computer system 20 (e.g., the mobile smartphone 132) to the cloud-computing environment 130. Any data uploaded from the antimalware driver 42 may then be unified/merged with other data collected from other platforms, perhaps filtered and condensed into a single console.

Figure 10:
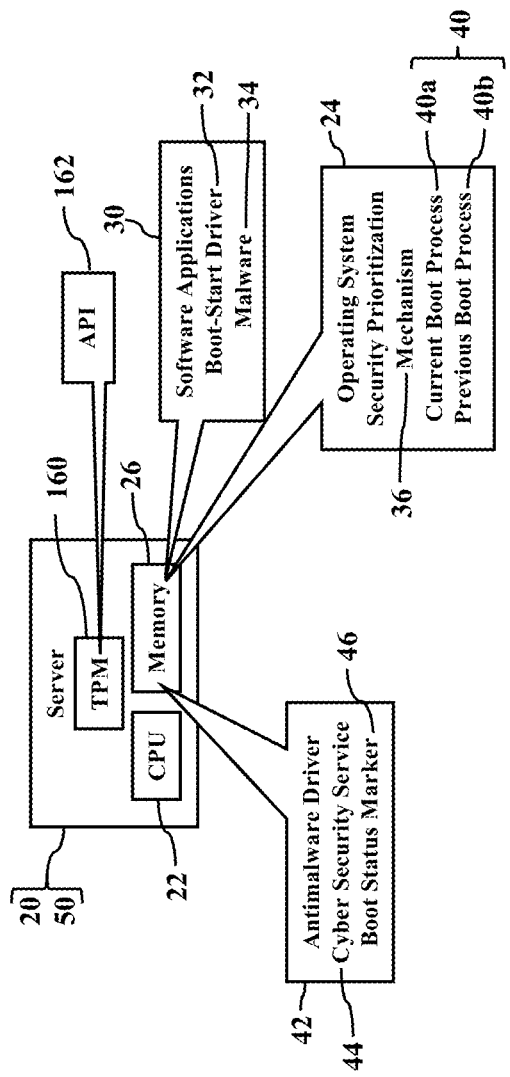

FIG. 10 illustrates more examples of the cyber security service 44. In these examples, configuration data may be provided to the antimalware driver 42. While any configuration data may be specified, FIG. 10 illustrates configurational data for interfacing with a Trusted Platform Module (or TPM) 160. The Trusted Platform Module 160 is a specialized chip processor that is designed to provide hardware-based, security-related cryptographic operations (such as keys). The Trusted Platform Module 160 has application programming interfaces (or APIs) 162 for accessing, calling, and/or obtaining cryptographic services. The antimalware driver 42 may thus use the APIs 162 to the TPM 160 to revoke the computer system's attestation if any boot-start driver 32 cannot be blocked without preventing the computer system 20 from booting. This need not be performed by default as it may leave the computer system 20 in an unreachable state. Communicating the configuration data to the antimalware driver 42 may be performed via the registry 98.

Figure 11:
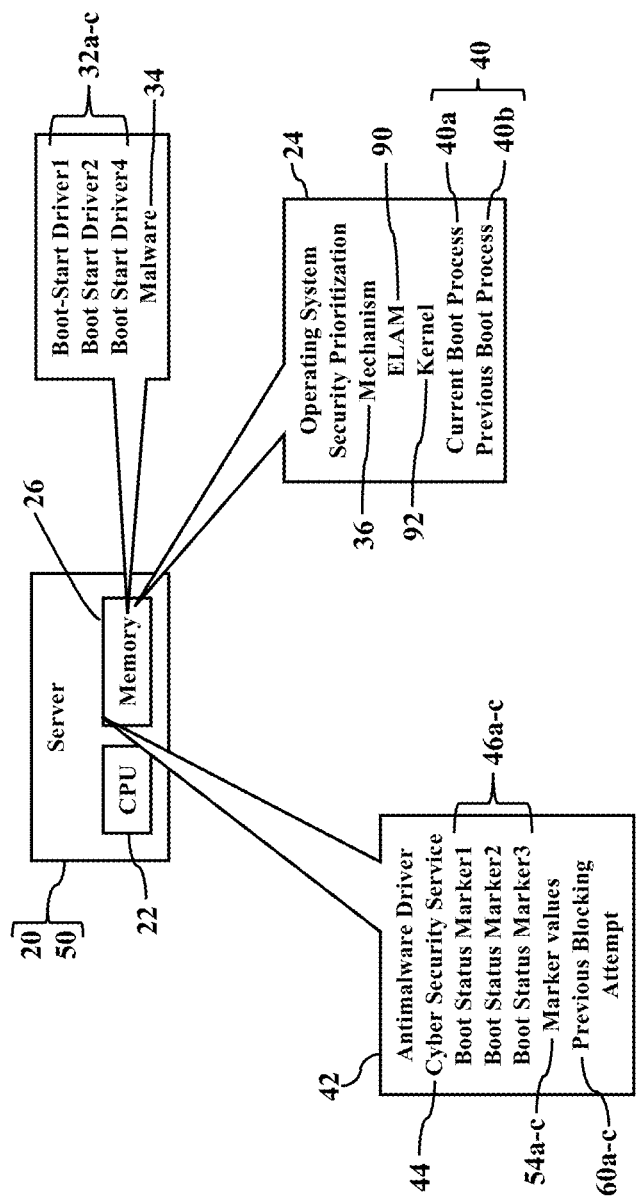
FIGS. 11-14 illustrate more examples of the boot status marker(s)
Figure 12:
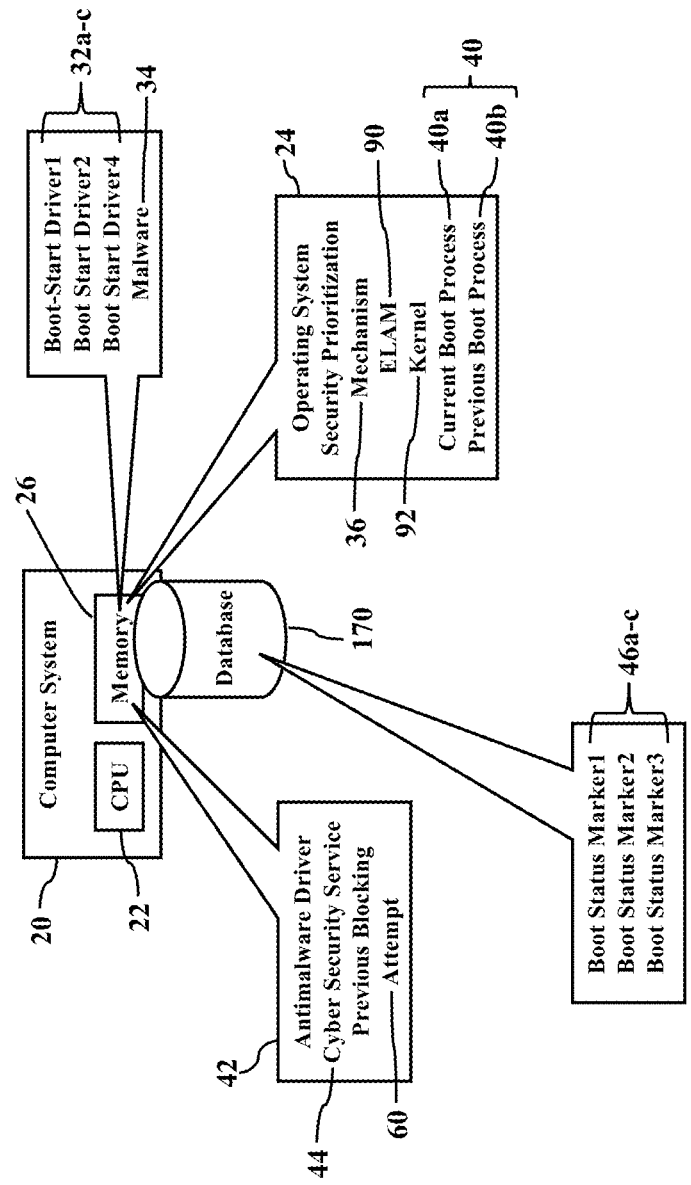
Figure 13:
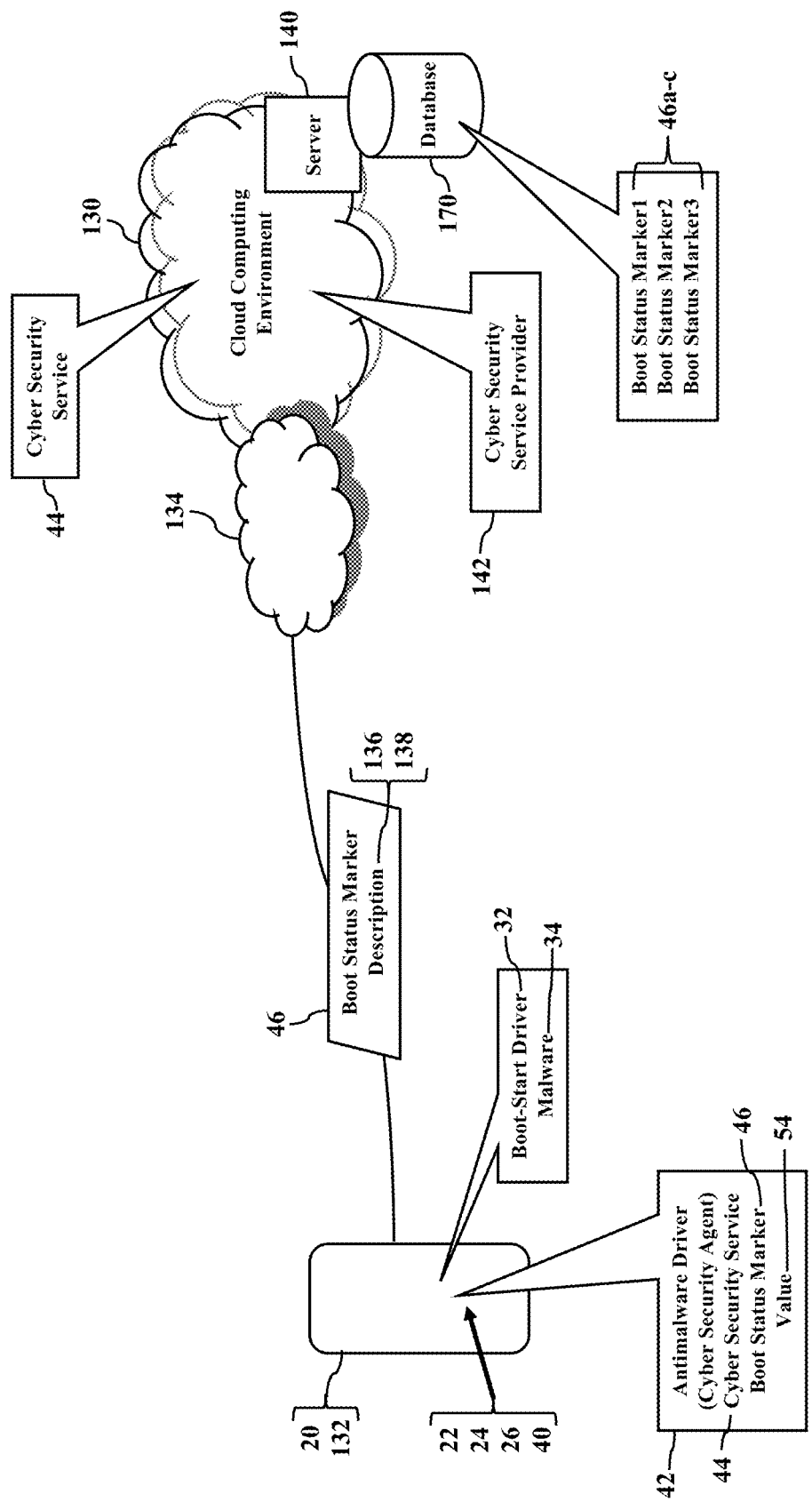

FIGS. 11-14 illustrate more examples of the boot status marker 46. The antimalware driver 42 may establish or define multiple boot status markers 46, with each individual boot status marker 46 corresponding to a different one of the boot-start drivers 32. While there may be many different boot-start drivers 32, FIG. 11 illustrates a simple example of three (3) boot-start drivers 32a-c and their corresponding boot status markers 46a-c. Each boot status marker 46a-c may thus have its corresponding marker value 54a-c that records a result of the previous blocking attempt 60a-c during any previous boot process 40b. Again, while any value system may be used, the value 54 assigned to each boot status marker 46 indicates the failure 52, or the completion 70, of the previous boot process 40b when blocking the corresponding boot-start driver 32 (as previously explained). Moreover, the marker value 54 (or lack thereof) may further indicate the unknown driver 80 (as also previously explained). As yet more examples, FIGS. 12-13 illustrate an electronic database 170 of the boot status markers 46. The electronic database 170 of the boot status markers 46 may store an electronic record of each boot-start driver 32, each boot process 40, and/or each boot status marker 46. FIG. 12 illustrates the electronic database 170 as being locally stored in the memory device 26 of the computer system 20. FIG. 13 illustrates the electronic database 170 as being remotely stored and accessed via the cloud-computing environment 130. FIG. 13, for simplicity, illustrates the electronic database 170 as being maintained by the cloud server 140, but any network member of the cloud-computing environment 130 may provide the electronic database 170.

Figure 14:
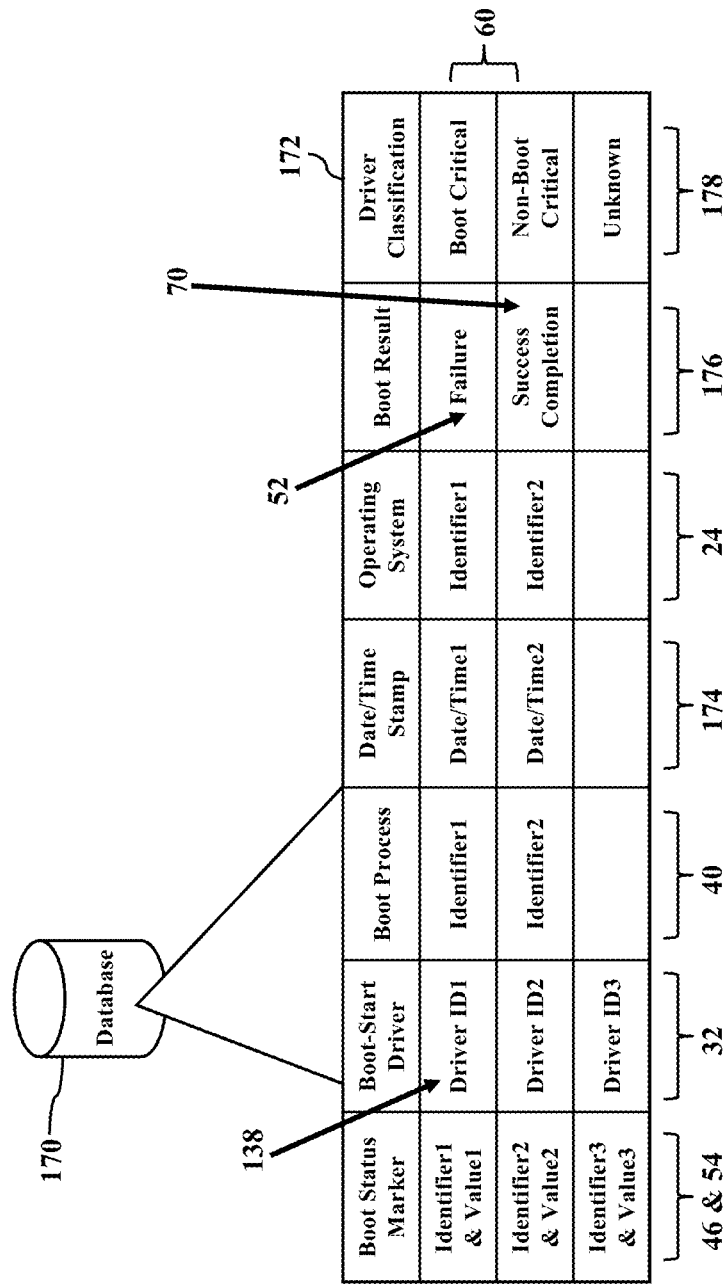

FIG. 14 illustrates examples of the electronic database 170 of the boot status markers 46. Even though the electronic database 170 may have any logical structure, a relational database is perhaps easiest to understand. FIG. 14 thus illustrates the electronic database 170 as a table 172 having row and columnar database entries that map, relate, convert, or associate different boot status markers 46 to their corresponding boot-start drivers 32. While the electronic database 170 may have hundreds or even thousands of database entries, FIG. 14 illustrates a simple example that only logs three (3) previous blocking attempts 60. As FIG. 14 also illustrates, the electronic database 170 may include more database entries that associate each boot status marker 46 to its corresponding previous or otherwise historical boot process 40 and timestamp 174. So, as the computer system 20 performs different boot processes 40 and different blocking attempts 60, the antimalware driver 42 may log each boot process 40, its corresponding operating system 24 and the boot-start drivers 32 that were loaded or blocked (e.g., the previous blocking attempt 60), the boot result 176 (e.g., the failure 52, or the completion 70, or the unknown driver 80), the corresponding driver classification 178, and/or the corresponding boot status marker 46. The antimalware driver 42, and/or the cloud-computing environment 130, may thus quickly and easily identify which boot-start drivers 32 were previously and successfully blocked and which blocked boot-start drivers 32 caused the boot error 56. So, when the antimalware driver 42 evaluates any boot-start drivers 32, the antimalware driver 42 may query the electronic database 170 and identify and/or retrieve any matching entry (such as the driver identifier 138) that was previously logged. If a matching database entry is determined, then the antimalware driver 42 may quickly and simply identify and/or retrieve any corresponding columnar/row entries (such as the historical boot status marker 46 previously applied).

The cyber security service 44 may thus swiftly and easily classify any boot-start driver 32. When the antimalware driver 42 classifies the boot-start driver 32, the antimalware driver 42 need only perform a database lookup. The antimalware driver 42 may query the local electronic database 170 (e.g., FIG. 12) or query the cloud-based electronic database 170 (e.g., FIG. 13). The antimalware driver 42 may specify a query parameter (such as the driver identifier 138) and retrieve the driver classification 172, the boot result 176, and any other entries related to any historically-logged previous boot process 40b. The antimalware driver 42 may also retrieve the historical boot status marker 46.

Figure 15:
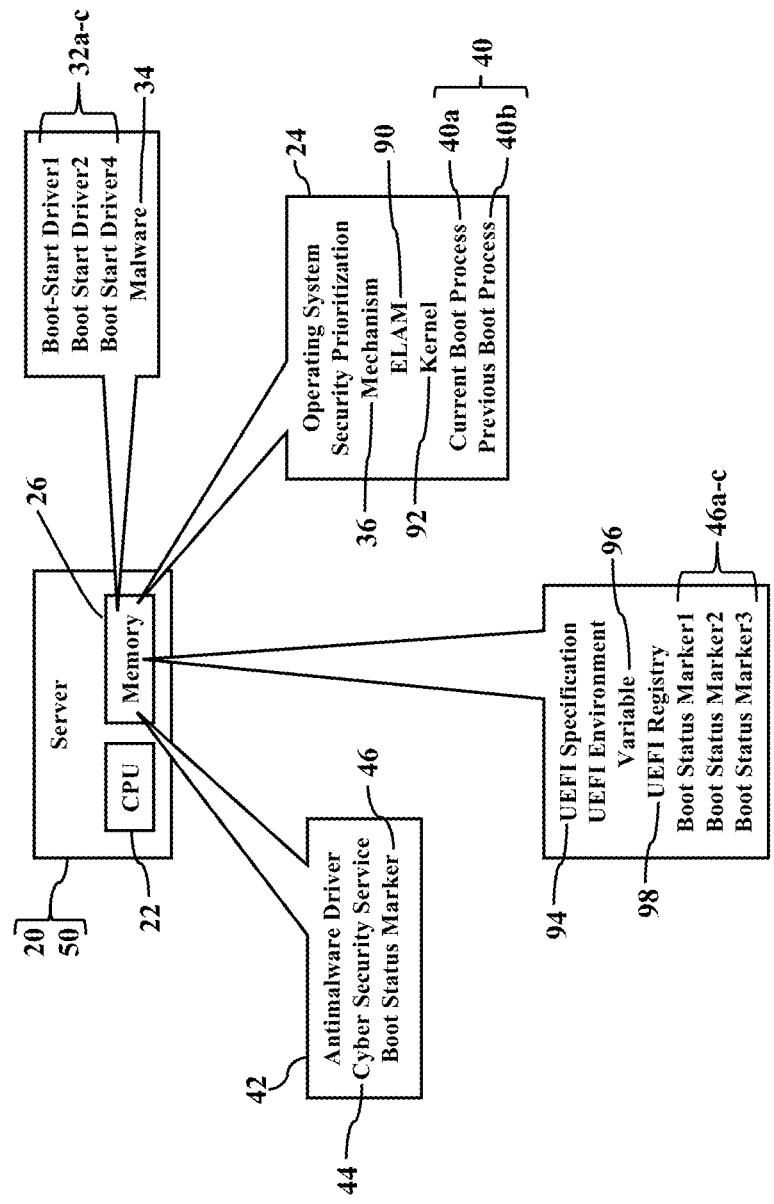
FIG. 15 illustrates still more examples of the boot status marker.

FIG. 15 illustrates still more examples of the boot status marker 46. The boot status marker 46 may again be associated with the Unified Extensible Firmware Interface (or UEFI) specification 94. The storage space associated with the UEFI specification 94 (such as the registry 98) may be configurable or sized to insert, contain, or reference the multiple boot status markers 46. Again, while there may be many different boot-start drivers 32, FIG. 15 again illustrates the simple example of the three (3) boot-start drivers 32a-c and their corresponding boot status markers 46a-c. The registry 98, for example, may be configurable in bit/byte size during any boot process 40. The registry 98, for example, may be sized to store or contain the boot status marker 46a-c that correspond to the three (3) boot-start drivers 32. Again, while each boot status marker 46a-c may have any text, value, or unit, let's again assume a simple binary (e.g., 0 or 1). Because there are three (3) boot-start drivers 32 in this example, the registry 98 may have a size configured for three (3) binary values (such as 000, 010, 110, or so on). As still more examples, each boot-start driver 32 may be formatted and implemented as a tuple or other listing. Again, then, the registry 98 may be size configured for three (3) tuples, with each tuple corresponding to one of the three (3) boot-start drivers 32. So, whatever the bit/byte size of the boot status marker 46, the operating system 24 and/or the antimalware driver 42 may configure the storage space associated with the UEFI specification 94 (such as the registry 98) to suit the multiple boot status markers 46.

Figure 16:
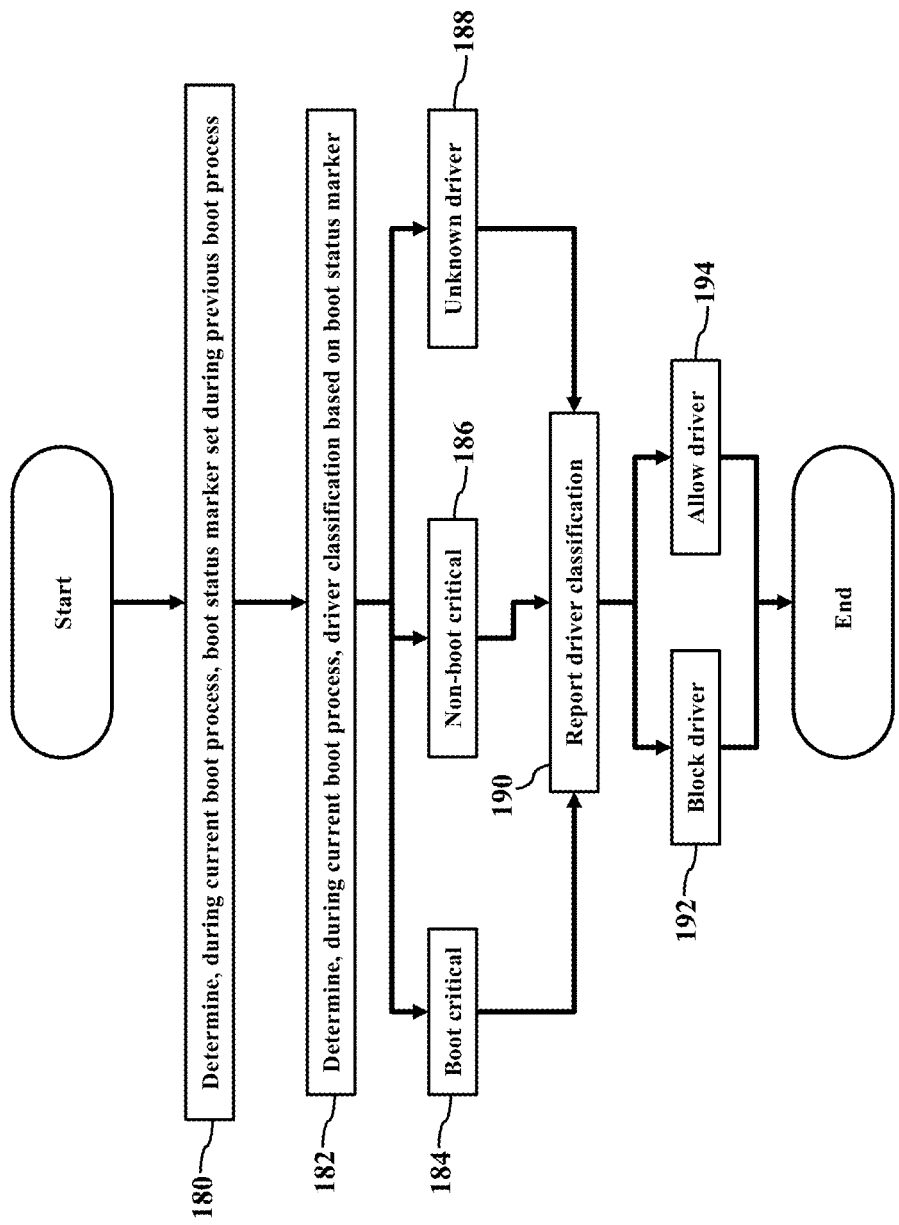
FIG. 16 illustrates examples of a method or operations that classify the boot-start driver.

FIG. 16 illustrates examples of a method or operations that classify the boot-start driver 32. The antimalware driver 42 determines, during the current boot process 40a, the boot status marker 46 set during the previous boot process 40b (Block 180). The antimalware driver 42 determines, during the current boot process 40a, the driver classification 178 based on the boot status marker 46 set during the previous boot process 40b (Block 182). The antimalware driver 42 may classify the boot-start driver 32 as the boot critical 58 (Block 184), the non-boot critical 72 (Block 186), and/or the unknown driver 80 (Block 188). The antimalware driver 42 reports the driver classification 178 (Block 190). The antimalware driver 42 and/or the operating system 24 blocks (Block 192) or allows (Block 194) a load and/or an execution of the boot-start driver 32.

Figure 17:
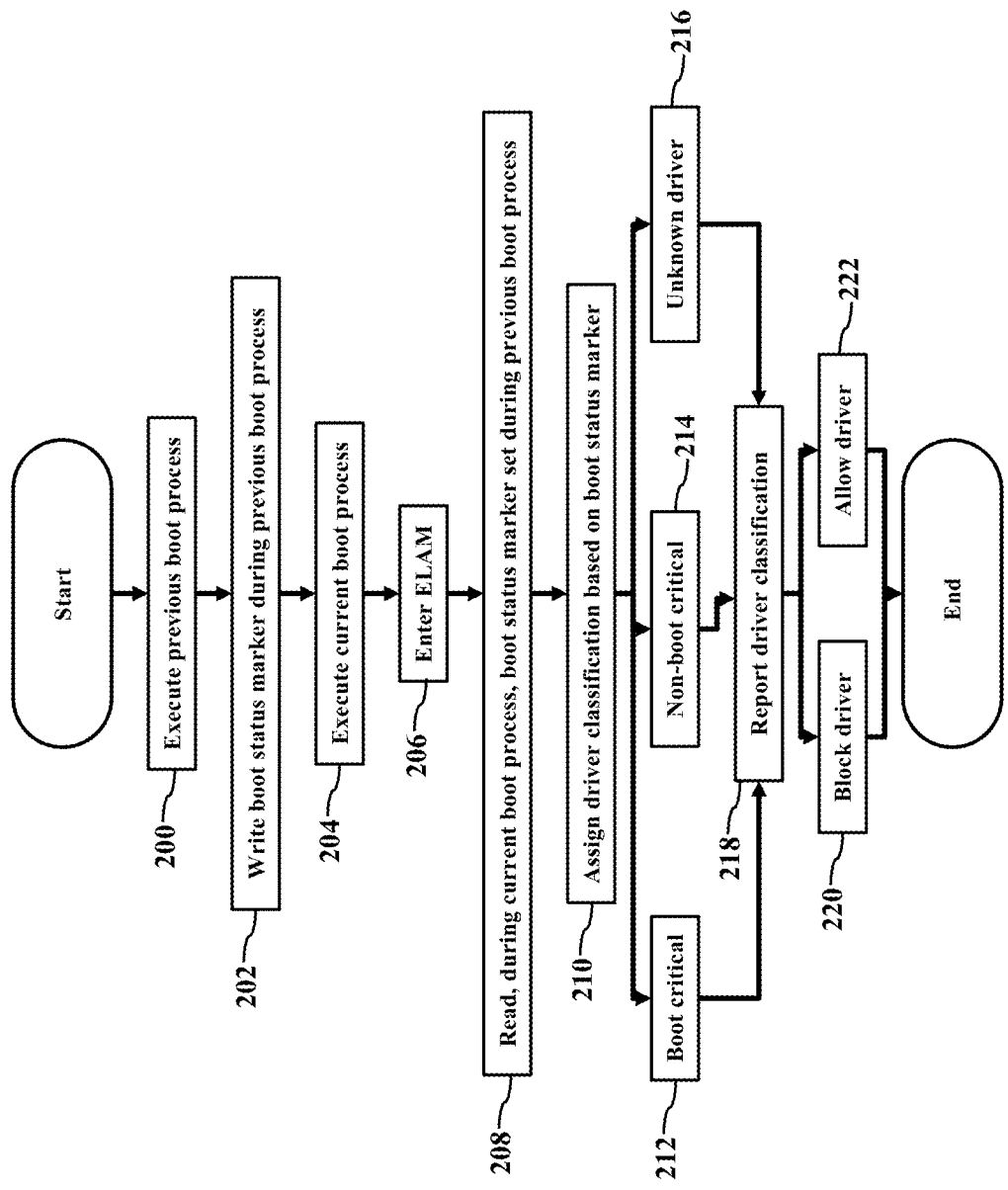
FIG. 17 illustrates more examples of a method or operations that evaluates the boot-start driver.

FIG. 17 illustrates more examples of a method or operations that evaluates the boot-start driver 32. The computer system 20 executes the previous boot process 40b (Block 200). The antimalware driver 42 cooperates or interfaces with the operating system 24 to write the boot status marker 46 during the previous boot process 40b (Block 202). The computer system 20 executes the current boot process 40a (Block 204) and the operating system 24 enters the Early Launch AntiMalware (ELAM) phase or feature 90 (Block 206). The antimalware driver 42 determines the boot status marker 46 set during the previous boot process 40b (Block 208). The antimalware driver 42 assigns the driver classification 178 (Block 210) as the boot critical 58 (Block 212), the non-boot critical 72 (Block 214), and/or the unknown driver 80 (Block 216). The antimalware driver 42 reports the driver classification 178 (Block 218). The antimalware driver 42 and/or the operating system 24 blocks (Block 220) or allows (Block 222) an initialization of the boot-start driver 32 during the current boot process 40a based on the boot status marker 46 set during the previous boot process 40b.

Figure 18:
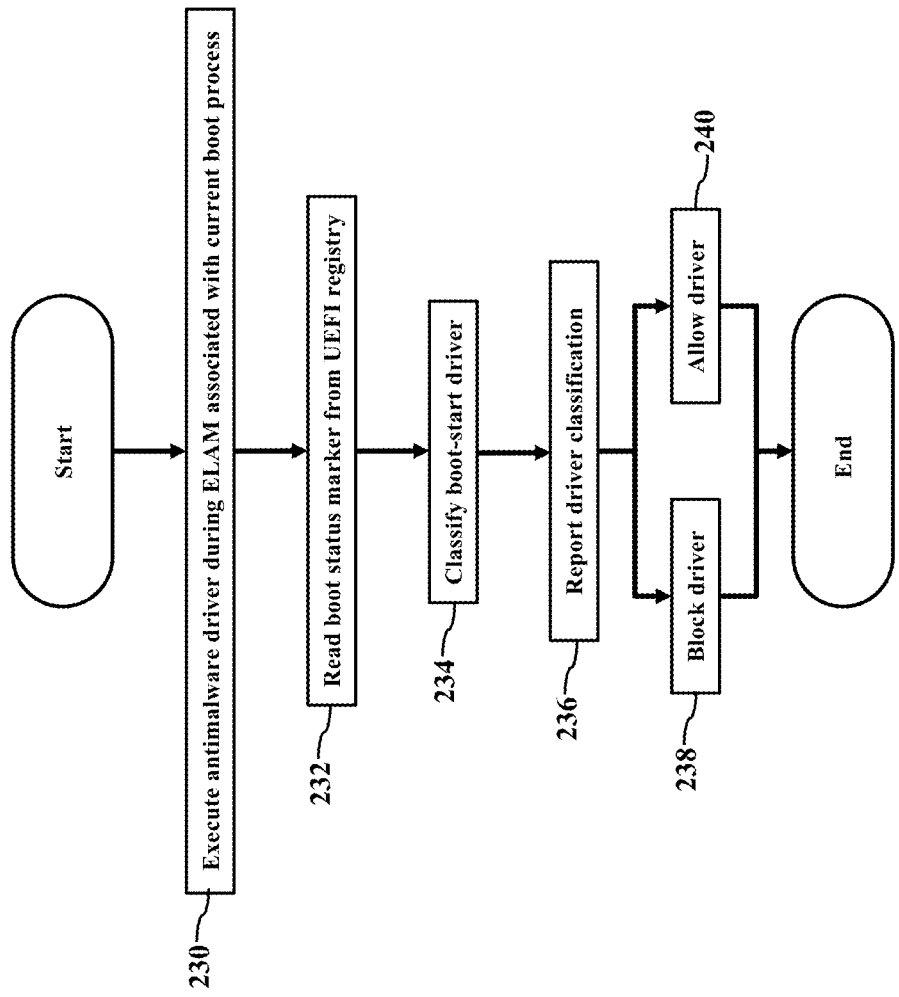
FIG. 18 illustrates still more examples of a method or operations that evaluate the boot-start driver.

FIG. 18 illustrates still more examples of a method or operations that evaluate the boot-start driver 32. The operating system 24 executes the antimalware driver 42 during the Early Launch AntiMalware (ELAM) associated with the current boot process 42a (Block 230). The boot status marker 46 is read from the UEFI registry 98 that was set during the previous boot process 40b (Block 232). The antimalware driver 42 classifies the boot-start driver 32 based on the boot-start driver 32 (Block 234) and reports the driver classification 178 (Block 236). The antimalware driver 42 and/or the operating system 24 blocks (Block 238) or allows (Block 240) the boot-start driver 32 during the current boot process 40a.

Figure 19:
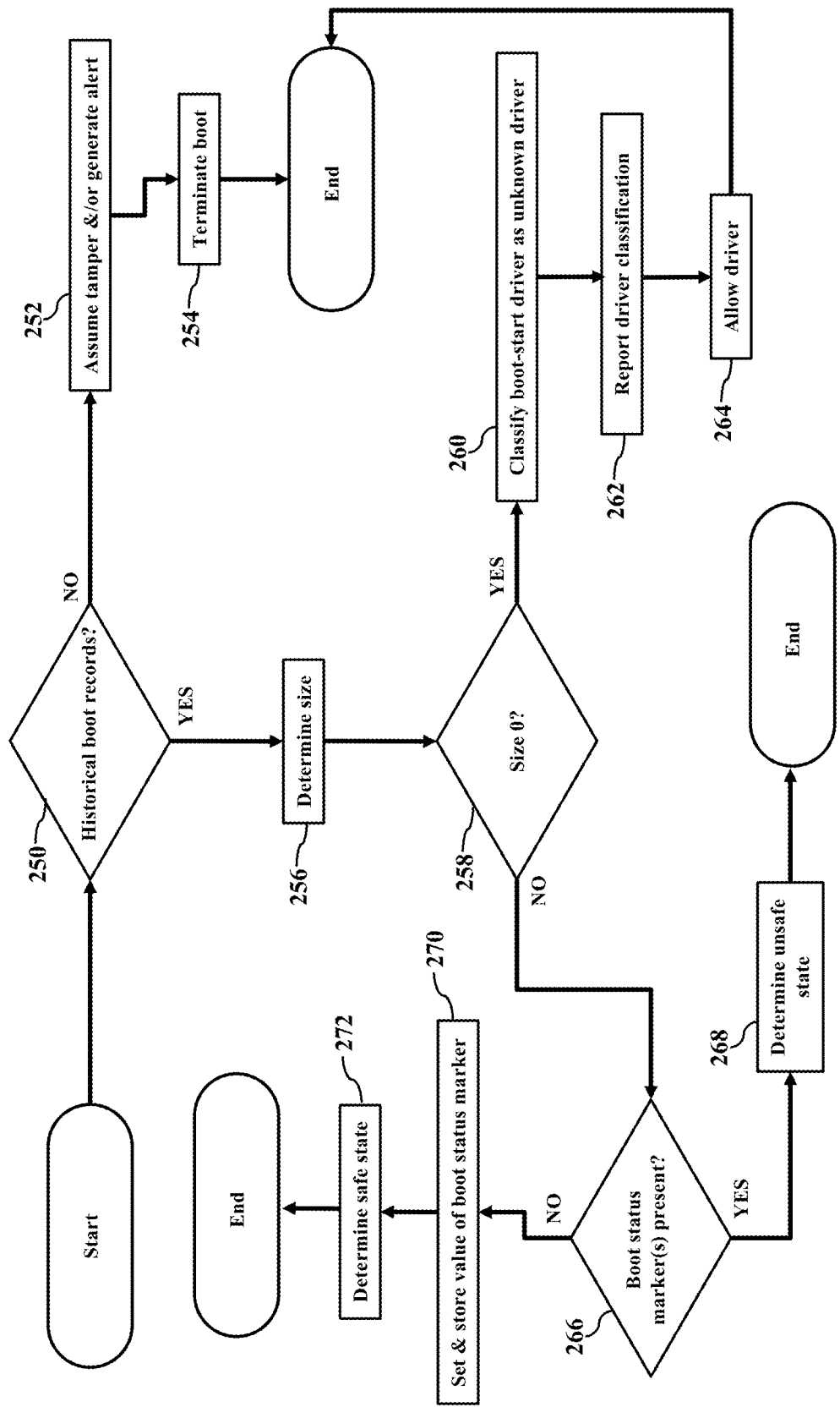
FIG. 19 illustrates even more examples of a method or operations that classify the boot-start driver.

FIG. 19 illustrates even more examples of a method or operations that classify the boot-start driver 32. The operating system 24, the antimalware driver 42, and/or the cloud-computing environment 130 may check for historical boot records (such as in the database 170 and/or in the registry 98) (Block 250). If the historical boot records are not present, then any of the operating system 24, the antimalware driver 42 and/or the cloud-computing environment 130 may assume that data has been tampered with and an alert/warning may be generated (Block 252). Because malicious tampering may be assumed, the boot process 40 may be terminated for safety (Block 254). The antimalware driver 42 should write out and encrypt an empty database if there is no data. If, however, the historical boot records are present (Block 250), then the bit/byte size is determined (Block 256). If the size is zero bits/bytes (Block 258), then there is no meaningful work to do, and all drivers (such as the boot-start driver 32) may be classified as the unknown driver(s) 80 (Block 260). The driver classification 178 is reported to the operating system 24 (Block 262), and the operating system 24 may allow the boot-start driver 32 to load/initialize/execute during the boot process 40 (Block 264). If, however, the size is not zero (Block 258), then the antimalware driver 42 and/or the cloud-computing environment 130 may check for the presence of the boot status marker(s) 46. If the boot status marker(s) 46 already exists/exist (Block 266), then the computer system 20 is not in a safe state (Block 268), as the antimalware driver 42 may have prevented a successful boot. If, however, the boot status marker(s) 46 docs/do not already exist (Block 266), then the boot status marker(s) 46 is/are set (Block 270) and a safe state is determined (Block 272).

Figure 20:
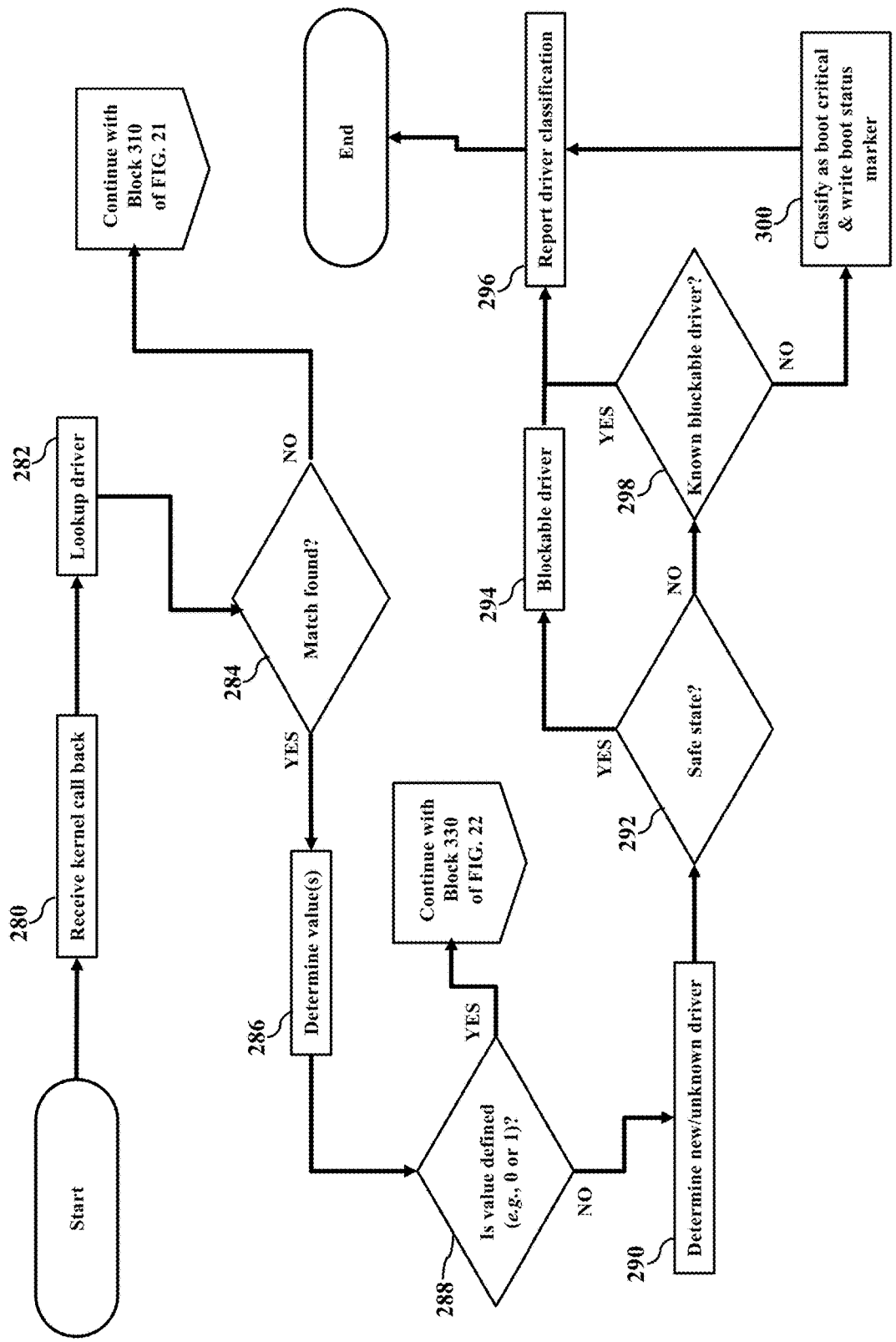
FIGS. 20-22 illustrate yet more examples of a method or operations that classify the boot-start driver.
Figure 21:
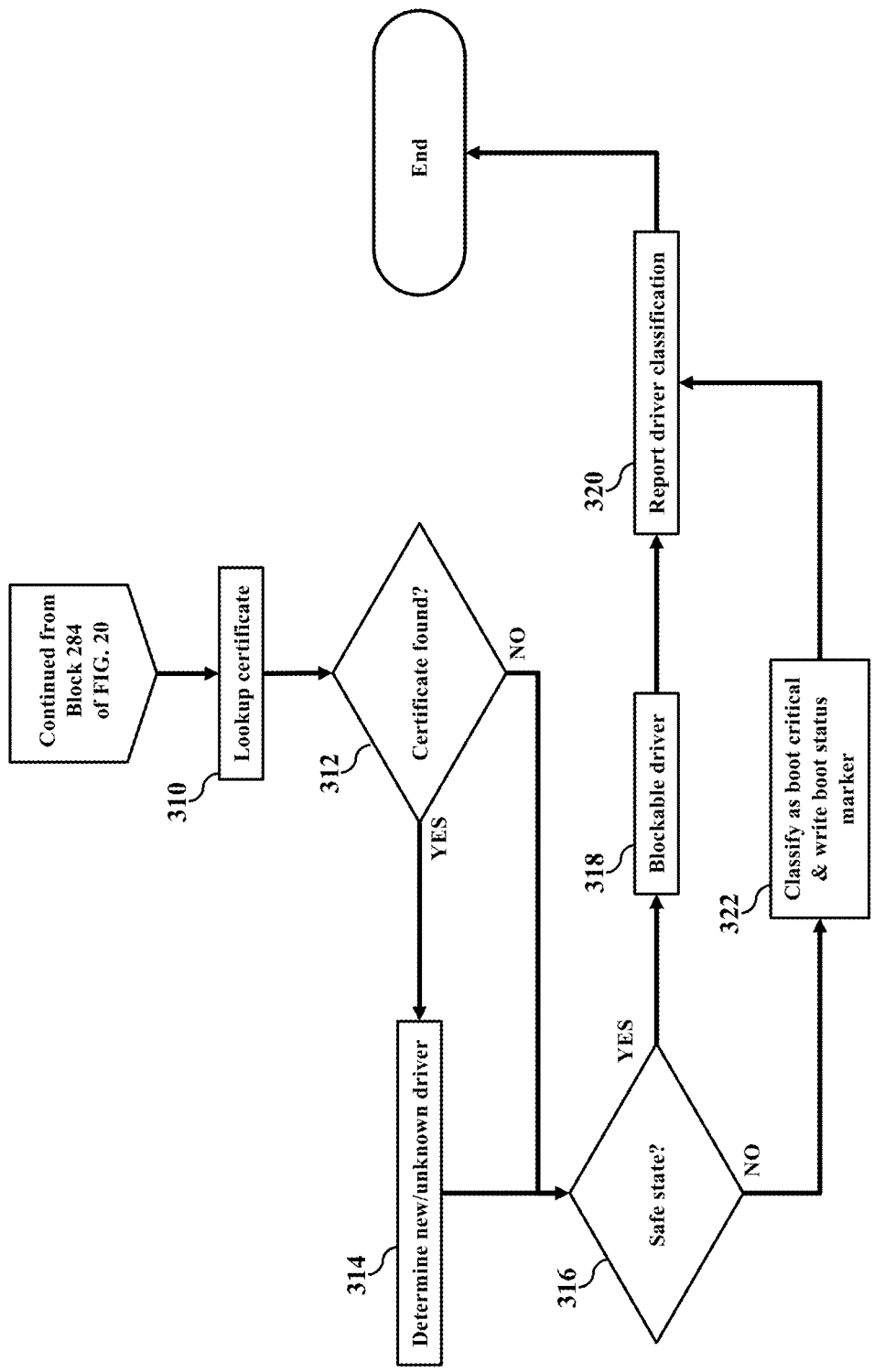
Figure 22:
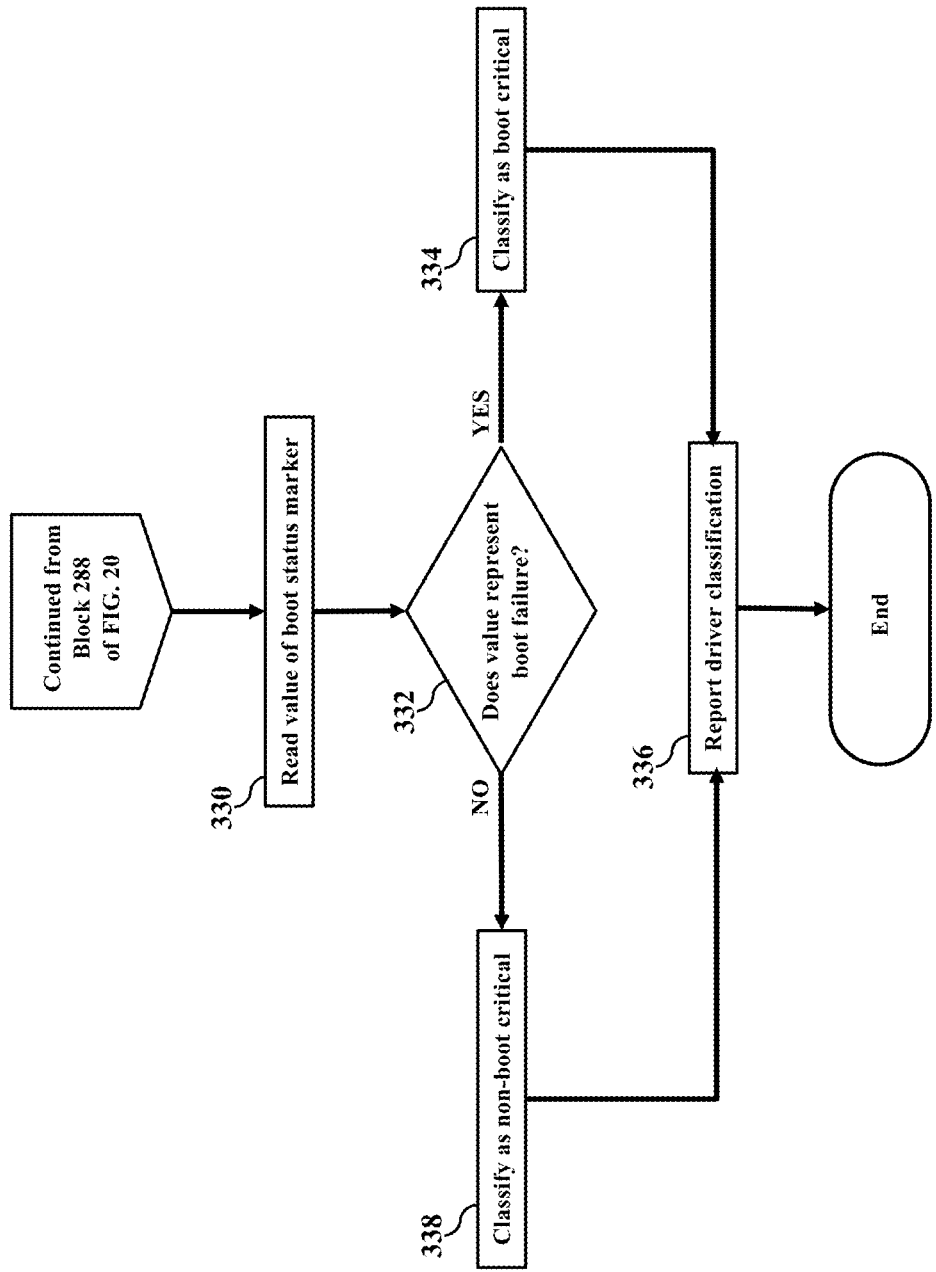

FIGS. 20-22 illustrate yet more examples of a method or operations that classify the boot-start driver 32. When a call back is received from the kernel 92 during the current boot process 40a (Block 280), the call back may identify the boot-start driver 32 or other driver. The call back, for example, may specify a hash value or other driver identifier 138. The antimalware driver 42 and/or the cloud-computing environment 130 may lookup the driver identifier 138 in historical boot records (such as in the database 170 and/or in the registry 98) (Block 282). If the driver identifier 138 is matched (Block 284), then its value 54 is determined (Block 286). If the value 54 is undefined/null/empty (Block 288), then the boot-start driver 32 is determined to be new and classified as the unknown driver 80 (Block 290). Again, if the value 54 is defined (e.g., 0 or 1), then the boot-start driver 32 may be either the boot critical 58 or the non-boot critical 72 (as explained with reference to FIGS. 2-3). If the computer system 20 and/or the operating system 24 is in the safe state (Block 292), then the boot-start driver 32 may be blocked (Block 294) and the driver classification 178 is reported to the operating system 24 (Block 296). If, however, the computer system 20 and/or the operating system 24 is not in the safe state (Block 292), then the antimalware driver 42 and/or the cloud-computing environment 130 may query for or inspect historical boot records (such as the database 170 and/or the registry 98) for data/information/records associated with the boot-start driver 32. If the historical boot records reveal that the boot-start driver 32 has been historically classified and is known to be blockable (Block 298), then the driver classification 178 is reported to the operating system 24 (Block 296). If, however, no historical boot records exist, then the boot-start driver 32 remains unknown (Block 298). The boot-start driver 32 is classified as the boot critical 58 and the corresponding value 54 for the boot status marker 46 is written (Block 300). The driver classification 178 is reported to the operating system 24 (Block 296).

The flowchart continues with FIG. 21. When the driver identifier 138 is not found in the historical boot records (such as in the database 170 and/or in the registry 98) (see Block 282 of FIG. 20), the boot-start driver 32 may be associated with a certificate. The antimalware driver 42 and/or the cloud-computing environment 130 may lookup the certificate in historical boot records (such as the registry 98, the database 170, and/or other registry signature data) (Block 310). Whether or not the certificate is found (Block 312), the boot-start driver 32 is determined to be new or unknown (Block 314). That is, a security policy may consider that any/all drivers found by their certificates (or not found) are considered new/unknown. If the computer system 20 and/or the operating system 24 is in the safe state (Block 316), then the boot-start driver 32 may be blocked (Block 318) and the driver classification 178 is reported to the operating system 24 (Block 320). If, however, the computer system 20 and/or the operating system 24 is in an unsafe state (Block 316), then the certificate may be classified as the boot critical 58 and the corresponding value 54 for the boot status marker 46 is written (Block 322). The driver classification 178 is reported to the operating system 24 (Block 320). Although not shown, there may be instances when the boot-start driver 32 should have been blocked, but the boot status indicator 46 indicates that the boot-start driver 32 cannot be blocked due to being the boot critical 58. In these instances, then, any attestation (associated with the certificate) may be revoked (when, for example, a revoke attestation configuration option is enabled).

The flowchart continues with FIG. 22. When the value 54 of the boot status marker 46 is defined (see Block 288 of FIG. 20), then the value 54 is read (Block 330). Again, if the value 54 is defined (e.g., 0 or 1), then the boot-start driver 32 may be either the boot critical 58 or the non-boot critical 72 (as explained with reference to FIGS. 2-3). If the value 54 represents, or is associated with, the boot critical 58 (Block 332), then the boot-start driver 32 is classified as the boot critical 58 (Block 334) and the driver classification 178 is reported to the operating system 24 (Block 336). If, however, the value 54 does not indicate boot critical 58 (Block 332), then the boot-start driver 32 is classified as the non-boot critical 72 (Block 338) and the driver classification 178 is reported to the operating system 24 (Block 336).

Figure 23:
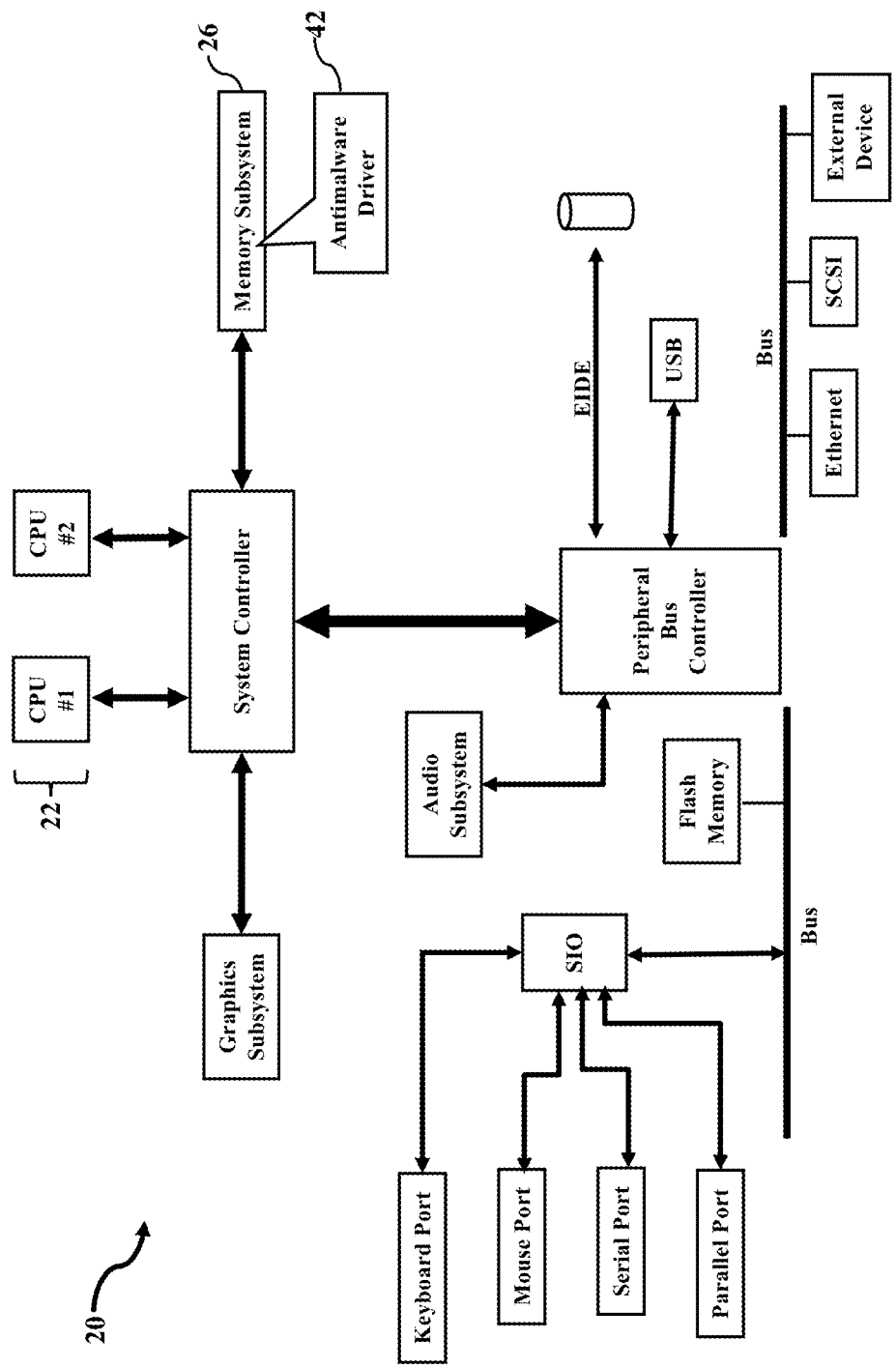
FIG. 23 illustrates a more detailed example of the operating environment.

FIG. 23 illustrates a more detailed example of the operating environment. FIG. 23 is a more detailed block diagram illustrating the computer system 20. The antimalware driver 42 is stored in the memory subsystem or device 26. One or more of the processors 22 communicate with the memory subsystem or device 26 and execute the antimalware driver 42. Examples of the memory subsystem or device 26 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology. Because the computer system 20 is known to those of ordinary skill in the art, no detailed explanation is needed.

The computer system 20 may have any embodiment. This disclosure mostly discusses the computer system 20 as the laptop 28, the server 50, and the smartphone 132. The antimalware driver 42 and the boot status marker 46, however, may be easily adapted to other operating environments, such as a switch, router, or any other network member of the cloud-computing environment 130. The antimalware driver 42 and the boot status marker 46 may also be easily adapted to other mobile computing, such as where the computer system 20 may be a tablet computer or a smartwatch. The antimalware driver 42 and the boot status marker 46 may also be easily adapted to other embodiments of smart devices, such as a television, an audio device, a remote control, and a recorder. The antimalware driver 42 and the boot status marker 46 may also be easily adapted to still more smart appliances, such as washers, dryers, and refrigerators. Indeed, as cars, trucks, and other vehicles grow in electronic usage and in processing power, the antimalware driver 42 and the boot status marker 46 may be easily incorporated into any vehicular controller.

The above examples of the antimalware driver 42 and the boot status marker 46 may be applied regardless of the networking environment. The antimalware driver 42 and the boot status marker 46 may be easily adapted to stationary or mobile devices having wide-area networking (e.g., 4G/LTE/5G cellular), wireless local area networking (WI-FI®), near field, and/or BLUETOOTH® capability. The antimalware driver 42 and the boot status marker 46 may be applied to stationary or mobile devices utilizing any portion of the electromagnetic spectrum and any signaling standard (such as the IEEE 802 family of standards, GSM/CDMA/TDMA or any cellular standard, and/or the ISM band). The antimalware driver 42 and the boot status marker 46, however, may be applied to any processor-controlled device operating in the radio-frequency domain and/or the Internet Protocol (IP) domain. The antimalware driver 42 and the boot status marker 46 may be applied to any processor-controlled device utilizing a distributed computing network, such as the Internet (sometimes alternatively known as the "World Wide Web"), an intranet, a local-area network (LAN), and/or a wide-area network (WAN). The antimalware driver 42 and the boot status marker 46 may be applied to any processor-controlled device utilizing power line technologies, in which signals are communicated via electrical wiring. Indeed, the many examples may be applied regardless of physical componentry, physical configuration, or communications standard(s).

The computer system 20 may utilize any processing component, configuration, or system. For example, the antimalware driver 42 and the boot status marker 46 may be easily adapted to any desktop, mobile, or server central processing unit or chipset offered by INTEL®, ADVANCED MICRO DEVICES®, ARM®, APPLE®, TAIWAN SEMICONDUCTOR MANUFACTURING®, QUALCOMM®, or any other manufacturer. The computer system 20 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When any of the central processing units or chipsets execute instructions to perform "operations," this could include the central processing unit or chipset performing the operations directly and/or facilitating, directing, or cooperating with another device or component to perform the operations.

The antimalware driver 42 and the boot status marker 46 may use packetized communications. When the computer system 20 communicates via a communications network (such as the cloud-computing network 130 or the access network 134 illustrated in FIG. 8), information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

Any communications network may utilize any signaling standard. The cloud-computing environment 130 may mostly use wired networks to interconnect the network members. However, the cloud-computing environment 130 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The communications network and the cloud-computing environment 130 may also utilize other standards, such as the I.E.E.E. 802 family of standards, the Industrial, Scientific, and Medical band of the electromagnetic spectrum, BLUETOOTH®, low-power or near-field, and any other standard or value.

The antimalware driver 42 and the boot status marker 46 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for providing the antimalware driver 42 and the boot status marker 46, as the above paragraphs explain.

The diagrams, schematics, illustrations, and the like represent conceptual views or processes illustrating examples of the antimalware driver 42 and the boot status marker 46. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method that classifies a boot-start driver, comprising:
    determining, by an antimalware driver during a current boot process associated with an operating system, a boot status marker set during a previous boot process;

determining, by the antimalware driver during the current boot process, a driver classification associated with the boot-start driver, the driver classification based on the boot status marker set during the previous boot process; and reporting, by the antimalware driver during the current boot process, the driver classification to the operating system.

2. The method of claim 1, wherein in response to the boot status marker, further comprising blocking an execution of the boot-start driver.

3. The method of claim 1, wherein in response to the boot status marker, further comprising allowing an execution of the boot-start driver.

4. The method of claim 1, wherein the determining of the boot status marker further comprises reading a memory storing the boot status marker set during the previous boot process.

5. The method of claim 1, further comprising classifying the boot-start driver as boot critical in response to the boot status marker.

6. The method of claim 1, further comprising determining the previous boot process successfully completed based on the boot status marker.

7. The method of claim 1, further comprising reporting the boot status marker via a network interface to a service provider.

8. A computer system that evaluates a boot-start driver, comprising:
a central processing unit; and
a memory device storing instructions that, when executed by the central processing unit, perform operations, the operations comprising:
executing an antimalware driver during an Early Launch AntiMalware (ELAM) feature associated with a current boot process by an operating system;
determining, during the ELAM feature associated with the current boot process, a boot status marker set during a previous boot process; and
blocking or allowing an initialization of the boot-start driver during the current boot process based on the boot status marker set during the previous boot process.

9. The computer system of claim 8, wherein the operations further comprise determining the boot status marker set by the antimalware driver during the previous boot process.

10. The computer system of claim 8, wherein the operations further comprise assigning a driver classification associated with the boot-start driver based on the boot status marker set during the previous boot process.

11. The computer system of claim 8, wherein the operations further comprise reading the boot status marker.

12. The computer system of claim 8, wherein the operations further comprise classifying the boot-start driver as boot critical in response to the boot status marker.

13. The computer system of claim 8, wherein the operations further comprise classifying the boot-start driver as non-boot critical in response to the boot status marker.

14. The computer system of claim 8, wherein the operations further comprise classifying the boot-start driver as an unknown driver in response to the boot status marker.

15. The computer system of claim 8, wherein the operations further comprise determining the boot-start driver is blockable in response to the boot status marker.

16. The computer system of claim 8, wherein the operations further comprise writing the boot status marker to the memory device.

17. The computer system of claim 8, wherein the operations further comprise determining the previous boot process successfully completed based on the boot status marker.

18. The computer system of claim 8, wherein the operations further comprise reporting the boot status marker via a network interface to a cloud service provider.

19. A memory device storing instructions that, when executed by a central processing unit, perform operations that evaluate a boot-start driver, the operations comprising:
executing an antimalware driver during an Early Launch AntiMalware (ELAM) feature associated with a current boot process by an operating system;
reading, during the ELAM feature associated with the current boot process, a Unified Extensible Firmware Interface (UEFI) registry storing a boot status marker set by the antimalware driver during a previous boot process by the operating system; and
blocking or allowing an initialization of the boot-start driver during the current boot process based on the boot status marker read from the UEFI registry.

20. The memory device of claim 19, wherein the operations further comprise determining a driver classification associated with the boot-start driver based on the boot status marker read from the UEFI registry.

* * * * *